(12) United States Patent
Zhang et al.

(10) Patent No.: US 10,134,299 B2
(45) Date of Patent: Nov. 20, 2018

(54) SYSTEMS AND METHODS FOR FLIGHT SIMULATION

(71) Applicant: SZ DJI TECHNOLOGY Co., Ltd, Shenzhen (CN)

(72) Inventors: Liutao Zhang, Shenzhen (CN); Xuyang Pan, Shenzhen (CN); Shunnian Li, Shenzhen (CN); Chaobin Chen, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/415,743

(22) Filed: Jan. 25, 2017

(65) Prior Publication Data

US 2017/0330478 A1    Nov. 16, 2017

Related U.S. Application Data

(63) Continuation of application No. 14/936,532, filed on Nov. 9, 2015, now Pat. No. 9,589,476, which is a
(Continued)

(51) Int. Cl.
*G09B 9/24* (2006.01)
*G09B 19/16* (2006.01)
*B64C 39/02* (2006.01)
*G05D 1/00* (2006.01)
*G09B 9/08* (2006.01)

(52) U.S. Cl.
CPC .............. *G09B 9/24* (2013.01); *B64C 39/024* (2013.01); *G05D 1/0022* (2013.01); *G05D 1/0044* (2013.01); *G09B 9/08* (2013.01); *G09B 19/165* (2013.01); *B64C 2201/024* (2013.01); *B64C 2201/146* (2013.01)

(58) Field of Classification Search
CPC ........... G05D 1/0011; G09B 9/08; G09B 9/24
See application file for complete search history.

(56) References Cited

U.S. PATENT DOCUMENTS 3,220,121 A   11/1965  Cutler
5,947,824 A    9/1999  Minami et al.
(Continued)

FOREIGN PATENT DOCUMENTS

CN    101241653 A     8/2008
CN    202533754 U    11/2012
(Continued)

OTHER PUBLICATIONS

European Search Report and search opinion dated Mar. 27, 2017 for EP Application No. 14903341.7.
(Continued)

*Primary Examiner* — Jelani A Smith
*Assistant Examiner* — Kelly D Williams
(74) *Attorney, Agent, or Firm* — Anova Law Group, PLLC

(57) ABSTRACT

Systems and methods are provided for training a user to control an unmanned aerial vehicle (UAV) in an environment. The systems and methods provide a simulation environment to control a UAV in a virtual environment. The virtual environment closely resembles a real flight environment. The controller used to transmit flight commands and receive flight state data can be used in both simulation and flight modes of operation.

20 Claims, 10 Drawing Sheets

Related U.S. Application Data continuation of application No. PCT/CN2014/088051, filed on Sep. 30, 2014.

(56) References Cited

U.S. PATENT DOCUMENTS

| | | | |
|---|---|---|---|
| 6,527,225 | B1 | 3/2003 | Silder, Jr. et al. |
| 7,970,532 | B2 | 6/2011 | Tehan et al. |
| 8,239,047 | B1 | 8/2012 | Bergeron |
| 8,942,964 | B2 | 1/2015 | McWilliams, III et al. |
| 9,589,476 | B2 | 3/2017 | Zhang et al. |
| 2002/0087296 | A1 | 7/2002 | Wynn |
| 2003/0211806 | A1 | 11/2003 | Paterson |
| 2006/0223637 | A1 | 10/2006 | Rosenberg |
| 2007/0243505 | A1* | 10/2007 | Rath .......... G09B 9/48 434/29 |
| 2008/0147366 | A1 | 6/2008 | Schutz et al. |
| 2009/0069957 | A1 | 3/2009 | Nakamura |
| 2011/0301925 | A1* | 12/2011 | McWilliams, III ...... G09B 9/08 703/6 |
| 2013/0035805 | A1 | 2/2013 | Spinelli |
| 2014/0008496 | A1 | 1/2014 | Ye et al. |
| 2014/0018979 | A1 | 1/2014 | Goossen et al. |
| 2014/0113255 | A1 | 4/2014 | Lechner et al. |
| 2014/0221061 | A1 | 8/2014 | Sitnikau |
| 2014/0222248 | A1 | 8/2014 | Levien et al. |
| 2015/0064657 | A1* | 3/2015 | Hales .......... G09B 9/02 434/30 |
| 2015/0064658 | A1 | 3/2015 | Hales et al. |
| 2015/0302756 | A1 | 10/2015 | Guehring et al. |

FOREIGN PATENT DOCUMENTS

| | | |
|---|---|---|
| CN | 103149846 A | 6/2013 |
| CN | 103488179 A | 1/2014 |
| CN | 203551961 U | 4/2014 |
| CN | 104029825 A | 9/2014 |
| JP | 2007093045 A | 4/2007 |
| JP | 2010117656 A | 5/2010 |
| JP | 2012509812 A | 4/2012 |

OTHER PUBLICATIONS

Final Office Action dated Sep. 1, 2016 for U.S. Appl. No. 14/936,532.
International search report and written opinion dated Jun. 30, 2015 for PCT/CN2014/088051.
NitroPlanes. New RC Tech 6 CH Flight Simulator Remote Control for Helicopters/ Airplanes. http://www.nitroplanes.com/newrcte6chfl.html. 2014.
Notice of allowance dated Dec. 19, 2016 for U.S. Appl. No. 14/936,532.
Office action dated Feb. 26, 2016 for U.S. Appl. No. 14/936,532.
International Search Report dated Oct. 8, 2015, issued by the State Intellectual Property Office of the P.R. China in the counterpart International Application No. PCT/CN2015/082415; 4 pages.
Office action dated Feb. 16, 2017 for U.S. Appl. No. 15/349,893.
Written Opinion dated Oct. 8, 2015, issued by the State Intellectual Property Office of the P.R. China in the counterpart International Application No. PCT/CN2015/082415; 4 pages.

* cited by examiner

SYSTEMS AND METHODS FOR FLIGHT SIMULATION

CROSS-REFERENCE

This application is a continuation application of U.S. application Ser. No. 14/936,532, filed Nov. 9, 2015, which is a continuation application of International Application No. PCT/CN2014/088051, filed on Sep. 30, 2014, the content of which are hereby incorporated by reference in their entirety.

BACKGROUND OF THE INVENTION

Aerial vehicles such as unmanned aerial vehicles (UAVs) can travel along defined routes. UAVs can be controlled entirely or partially by a user off-board the UAV. A user can practice controlling a UAV using a simulation that depicts a UAV in a simulated environment in response to flight control commands from a user.

Learning to control a UAV can be difficult. Failure to properly control a UAV can result in damage to the UAV. Repairing damage to the UAV can be time consuming and expensive therefore it may be advantageous to teach a user to control a UAV in a virtual environment where a real UAV is not at risk of damage.

SUMMARY OF THE INVENTION

A need exists to provide a method of training a user to control flight of an unmanned aerial vehicle (UAV) in a simulated environment. Provided herein are systems and methods to generate a simulated virtual environment for flying and controlling actions of a UAV. The simulation uses an identical remote controller as is used in real flight of the UAV such that a user can become familiar with the control functions and sensitivity in a virtual environment and translate these factors directly to real flight of the UAV. A flight control system is provided to process and transmit data from virtual sensors to a simulation. The flight control system can be an identical flight control system to the flight control system used in real flight. A physical model can calculate responses to flight control input from a user and provide the response to a virtual sensor to generate a virtual sensor measurement. The flight control system can communicate flight state data to a display device through a direct connection or an indirect connection. The display device can provide the flight state data to a user through an image and/or textual display. The display device can provide the flight state data to a user and communicate with either or both of the remote controller and the flight control system using a software application (i.e. "app"). The flight control system can be on-board the UAV or on-board the display device.

An aspect of the invention is directed to a method of operating an unmanned aerial vehicle (UAV). The method may comprise receiving a UAV mode signal indicative of whether the UAV is to be in a flight mode or simulation mode; receiving, at a flight control system on-board the UAV, flight control data from a remote controller; and generating, at the flight control system, flight data in response to the flight control data from the remote controller. The flight data can be (1) communicated to one or more propulsion units of the UAV when the UAV is in flight mode and can be (2) not communicated to the one or more propulsion units of the UAV when the UAV is in simulation mode.

In some embodiments the UAV mode signal can be provided from a display device comprising a visual display. The display device can be a mobile device. The visual display can be configured to show simulated flight state information of the UAV when the UAV is in a simulation mode.

In some cases the UAV mode signal can be provided from the remote controller. The UAV mode signal can be provided by a user interacting with hardware of the UAV. The UAV can have the flight mode as a default and the UAV mode signal can indicate a change to the simulation mode. The UAV mode signal can be provided to an output switcher configured to determine whether the flight data is or is not communicated to the one or more propulsion units. The output switcher can communicate with the flight data to the one or more propulsion units when the UAV is in flight mode.

In some embodiments, the output switcher can communicate the flight data to a physical model comprising physical parameter information about the UAV. The physical model can provide physical simulation data in response to the flight data. The physical parameter information about the UAV can include dimensions of the UAV. The physical parameter information about the UAV can include aerodynamic properties of the UAV.

The physical simulation data can be provided to one or more virtual sensors configured to generate virtual sensor data based on the physical simulation data. The virtual sensor data can be provided to an inertial measurement unit configured to generate flight state information from the virtual sensor data and communicate the flight state information to the flight control system. The inertial measurement unit can be configured to receive real sensor data and generate flight state information from the real sensor data and communicate the flight state information to the flight control system. The flight control system can communicate simulated flight data to a display device comprising a visual display when the UAV is in the simulation mode.

Another aspect of the invention is directed to an unmanned aerial vehicle (UAV). The UAV can comprise: a receiver, configured to receive a UAV mode signal indicative of whether the UAV is to be in a flight mode or simulation mode; a flight control system configured to (1) receive flight control data from a remote controller, and (2) generate flight data in response to the flight control data; and one or more propulsion units configured to (1) actuate and permit flight of the UAV when the UAV is in a flight mode, or (2) remain dormant and not permit flight of the UAV when the UAV is in a simulation mode.

In some embodiments the UAV mode signal can be provided from a display device comprising a visual display. The display device can be a mobile device. The visual display can be configured to show simulated flight state information of the UAV when the UAV is in a simulation mode.

In some cases the UAV mode signal can be provided from the remote controller. The UAV mode signal can be provided by a user interacting with hardware of the UAV. The UAV can have the flight mode as a default and the UAV mode signal can indicate a change to the simulation mode. The UAV mode signal can be provided to an output switcher configured to determine whether the flight data is or is not communicated to the one or more propulsion units. The output switcher can communicate with the flight data to the one or more propulsion units when the UAV is in flight mode.

In some embodiments, the output switcher can communicate the flight data to a physical model comprising physical parameter information about the UAV. The physical model can provide physical simulation data in response to the flight data. The physical parameter information about the UAV can include dimensions of the UAV. The physical parameter information about the UAV can include aerodynamic properties of the UAV.

The physical simulation data can be provided to one or more virtual sensors configured to generate virtual sensor data based on the physical simulation data. The virtual sensor data can be provided to an inertial measurement unit configured to generate flight state information from the virtual sensor data and communicate the flight state information to the flight control system. The inertial measurement unit can be configured to receive real sensor data and generate flight state information from the real sensor data and communicate the flight state information to the flight control system. The flight control system can communicate simulated flight data to a display device comprising a visual display when the UAV is in the simulation mode.

In another aspect the invention is directed to a method of operating an unmanned aerial vehicle (UAV), said method comprising: receiving a UAV mode signal indicative of whether the UAV is to be in a flight mode or simulation mode; receiving, at a flight control system on-board the UAV, flight control data from a remote controller; and generating, at the flight control system, flight data in based on: (1) the flight control data from the remote controller and (2) one of the following: (a) real sensor data collected by physical sensors on-board the UAV when the UAV is in the flight mode, or (b) virtual sensor data generated by one or more processors when the UAV is in the simulation mode.

In some embodiments the UAV mode signal can be provided from a display device comprising a visual display. The display device can be a mobile device. The visual display can be configured to show simulated flight state information of the UAV when the UAV is in a simulation mode.

In some cases the UAV mode signal can be provided from the remote controller. The UAV mode signal can be provided by a user interacting with hardware of the UAV. The UAV can have the flight mode as a default and the UAV mode signal can indicate a change to the simulation mode. The UAV mode signal can be provided to an output switcher configured to determine whether the flight data is or is not communicated to the one or more propulsion units. The output switcher can communicate with the flight data to the one or more propulsion units when the UAV is in flight mode.

In some embodiments, the output switcher can communicate the flight data to a physical model comprising physical parameter information about the UAV. The physical model can provide physical simulation data in response to the flight data. The physical parameter information about the UAV can include dimensions of the UAV. The physical parameter information about the UAV can include aerodynamic properties of the UAV.

The physical simulation data can be provided to one or more virtual sensors configured to generate virtual sensor data based on the physical simulation data. The virtual sensor data can be provided to an inertial measurement unit configured to generate flight state information from the virtual sensor data and communicate the flight state information to the flight control system. The inertial measurement unit can be configured to receive real sensor data and generate flight state information from the real sensor data and communicate the flight state information to the flight control system. The flight control system can communicate simulated flight data to a display device comprising a visual display when the UAV is in the simulation mode.

Another aspect of the invention can provide an unmanned aerial vehicle (UAV) comprising: a receiver, configured to receive a UAV mode signal indicative of whether the UAV is to be in a flight mode or simulation mode; one or more sensors configured to collect real sensor data; a flight control system configured to (1) receive flight control data from a remote controller, and (2) generate flight data in response to (a) the flight control data and (b) one of the following: (i) the real sensor data when the UAV is in flight mode, or (ii) virtual sensor data generated by one or more processors when the UAV is in the simulation mode.

In some embodiments the UAV mode signal can be provided from a display device comprising a visual display. The display device can be a mobile device. The visual display can be configured to show simulated flight state information of the UAV when the UAV is in a simulation mode.

In some cases the UAV mode signal can be provided from the remote controller. The UAV mode signal can be provided by a user interacting with hardware of the UAV. The UAV can have the flight mode as a default and the UAV mode signal can indicate a change to the simulation mode. The UAV mode signal can be provided to an output switcher configured to determine whether the flight data is or is not communicated to the one or more propulsion units. The output switcher can communicate with the flight data to the one or more propulsion units when the UAV is in flight mode.

In some embodiments, the output switcher can communicate the flight data to a physical model comprising physical parameter information about the UAV. The physical model can provide physical simulation data in response to the flight data. The physical parameter information about the UAV can include dimensions of the UAV. The physical parameter information about the UAV can include aerodynamic properties of the UAV.

The physical simulation data can be provided to one or more virtual sensors configured to generate virtual sensor data based on the physical simulation data. The virtual sensor data can be provided to an inertial measurement unit configured to generate flight state information from the virtual sensor data and communicate the flight state information to the flight control system. The inertial measurement unit can be configured to receive real sensor data and generate flight state information from the real sensor data and communicate the flight state information to the flight control system. The flight control system can communicate simulated flight data to a display device comprising a visual display when the UAV is in the simulation mode.

An aspect of the invention can provide a method of operating a flight simulator, said method comprising: receiving, at a display device, simulated flight data from a flight control system on-board an unmanned aerial vehicle (UAV) when the UAV is in a simulation mode, wherein the simulated flight data is provided to the display device via a remote controller configured to (1) communicate with and (2) control flight of the UAV when the UAV is in a flight mode; and displaying, on a visual display of the display device, simulated flight state information of the UAV in response to the simulated flight data.

In some embodiments the display device can be a mobile device. The remote controller can communicate with the display device via a wired connection. The remote controller can communicate with the display device via a wireless connection. The remote controller can be configured to provide flight control data useful for generating the simulated flight data on-board the UAV when the UAV is in the simulation mode. The remote controller can include one or more joystick controls useful for controlling flight of the UAV when the UAV is in flight mode.

In some embodiments, the simulated flight data can originate from the flight control system on-board the UAV. The simulated flight data can be modified by the remote controller. The simulated flight data may not be modified by the remote controller.

In some cases the flight control system can receive virtual sensor data from one or more virtual sensors when the UAV is in the simulation mode and uses the virtual sensor data to generate the simulated flight data. The visual display can be a touchscreen. The simulated flight state information can include an image of the UAV relative to a simulated environment. The image can be an animation and the simulated environment is a three-dimensional environment.

In another aspect the invention can provide a non-transitory computer readable media comprising program instructions for performing a flight simulation, said non-transitory computer readable media comprising: program instructions for receiving, at a display device, simulated flight data from a flight control system on-board an unmanned aerial vehicle (UAV) when the UAV is in a simulation mode, wherein the simulated flight data is provided to the display device via a remote controller configured to (1) communicate with and (2) control flight of the UAV when the UAV is in a flight mode; and program instructions for displaying, on a visual display of the display device, simulated flight state information of the UAV in response to the simulated flight data.

In some embodiments the display device can be a mobile device. The remote controller can communicate with the display device via a wired connection. The remote controller can communicate with the display device via a wireless connection. The remote controller can be configured to provide flight control data useful for generating the simulated flight data on-board the UAV when the UAV is in the simulation mode. The remote controller can include one or more joystick controls useful for controlling flight of the UAV when the UAV is in flight mode.

In some embodiments, the simulated flight data can originate from the flight control system on-board the UAV. The simulated flight data can be modified by the remote controller. The simulated flight data may not be modified by the remote controller.

In some cases the flight control system can receive virtual sensor data from one or more virtual sensors when the UAV is in the simulation mode and uses the virtual sensor data to generate the simulated flight data. The visual display can be a touchscreen. The simulated flight state information can include an image of the UAV relative to a simulated environment. The image can be an animation and the simulated environment is a three-dimensional environment.

Another aspect of the invention can provide, A method of operating a flight simulator, said method comprising: receiving, at a flight control system on-board an unmanned aerial vehicle (UAV) when the UAV is in simulation mode, flight control data from a remote controller configured to (1) communicate with and (2) control flight of the UAV when the UAV is in flight mode; generating, at the flight control system, simulated flight data in response to the flight control data from the remote controller; and transmitting, to the remote controller, the simulated flight data from the flight control system.

In some embodiments the image is an animation and the simulated environment is a three-dimensional environment.

The flight control system can be further configured to (3) generate one or more flight signal to be communicated to the one or more propulsion units when the UAV in flight mode.

In some cases, the remote controller is configured to transmit the simulated flight data to a display device comprising a visual display. The display device can be a mobile device. The remote controller can communicate with the display device via a wireless connection. The visual display can show simulated flight state information of the UAV. The simulated flight state information can include an image of the UAV relative to a simulated environment. The remote controller can include one or more joystick controls useful for controlling flight of the UAV.

The flight control system can receive virtual sensor data from one or more virtual sensors when the UAV is in the simulation mode and uses the virtual sensor data to generate the simulated flight data. In some cases, the method can further comprise an inertial measurement unit configured to receive the virtual sensor data and generate flight state information from the virtual sensor data, and configured to transmit the flight state information to the flight control system when the UAV is in a flight simulation mode. The inertial measurement unit can be configured to receive real sensor data and generate flight state information from the real sensor data, and configured to transmit the flight state information to the flight control system when the UAV is in a flight mode. The flight control system can provide the flight control data to a physical model comprising physical parameter information about the UAV, and wherein the physical model provides physical simulation data to the virtual sensors in response to the flight control data.

In another aspect, the invention can provide an unmanned aerial vehicle (UAV) comprising: a flight control system configured to (1) receive flight control data from a remote controller, and (2) generate simulated flight data in response to the flight control data when the UAV is in a simulation mode; one or more propulsion units configured to (1) actuate and permit flight of the UAV when the UAV is in a flight mode, or (2) remain dormant and not permit flight of the UAV when the UAV is in a simulation mode; and a communication unit configured to transmit the simulated flight data to the remote controller.

In some embodiments the image is an animation and the simulated environment is a three-dimensional environment.

The flight control system can be further configured to (3) generate one or more flight signal to be communicated to the one or more propulsion units when the UAV in flight mode.

In some cases, the remote controller is configured to transmit the simulated flight data to a display device comprising a visual display. The display device can be a mobile device. The remote controller can communicate with the display device via a wireless connection. The visual display can show simulated flight state information of the UAV. The simulated flight state information can include an image of the UAV relative to a simulated environment. The remote controller can include one or more joystick controls useful for controlling flight of the UAV.

The flight control system can receive virtual sensor data from one or more virtual sensors when the UAV is in the simulation mode and uses the virtual sensor data to generate the simulated flight data. In some cases, the UAV can further comprise an inertial measurement unit configured to receive the virtual sensor data and generate flight state information from the virtual sensor data, and configured to transmit the flight state information to the flight control system when the UAV is in a flight simulation mode. The inertial measurement unit can be configured to receive real sensor data and generate flight state information from the real sensor data, and configured to transmit the flight state information to the flight control system when the UAV is in a flight mode. The flight control system can provide the flight control data to a physical model comprising physical parameter information about the UAV, and wherein the physical model provides physical simulation data to the virtual sensors in response to the flight control data.

In another aspect the invention can provide a method of operating a flight simulator, said method comprising: receiving, at a display device, simulated flight data from a flight control system on-board an unmanned aerial vehicle (UAV) when the UAV is in a simulation mode, wherein the simulated flight data is provided to the display device via the UAV, and wherein the UAV is configured to communicate with a remote controller configured to control flight of the UAV when the UAV is in a flight mode; and displaying, on a visual display of the display device, simulated flight state information of the UAV in response to the simulated flight data.

The display device can be a mobile device. The remote controller can be configured to provide flight control data useful for generating the simulated flight data on-board the UAV when the UAV is in the simulation mode. The remote controller can include one or more joystick controls useful for controlling flight of the UAV when the UAV is in flight mode. The remote controller can be configured to control actuation of a carrier that holds a payload of the UAV when the UAV is in flight mode.

The flight control system can receive virtual sensor data from one or more virtual sensors when the UAV is in the simulation mode and uses the virtual sensor data to generate the simulated flight data.

In some embodiments the visual display can be a touch screen. The simulated flight state information can include an image of the UAV relative to a simulated environment. The image can be an animation and the simulated environment can be a three-dimensional environment.

In another aspect the invention can provide, A non-transitory computer readable media comprising program instructions for performing a flight simulation, said non-transitory computer readable media comprising: program instructions for receiving, at a display device, simulated flight data from a flight control system on-board an unmanned aerial vehicle (UAV) when the UAV is in a simulation mode, wherein the simulated flight data is provided to the display device via the UAV, and wherein the UAV is configured to communicate with a remote controller configured to control flight of the UAV when the UAV is in a flight mode; and program instructions for displaying, on a visual display of the display device, simulated flight state information of the UAV in response to the simulated flight data.

The display device can be a mobile device. The remote controller can be configured to provide flight control data useful for generating the simulated flight data on-board the UAV when the UAV is in the simulation mode. The remote controller can include one or more joystick controls useful for controlling flight of the UAV when the UAV is in flight mode. The remote controller can be configured to control actuation of a carrier that holds a payload of the UAV when the UAV is in flight mode.

The flight control system can receive virtual sensor data from one or more virtual sensors when the UAV is in the simulation mode and uses the virtual sensor data to generate the simulated flight data.

In some embodiments the visual display can be a touch screen. The simulated flight state information can include an image of the UAV relative to a simulated environment. The image can be an animation and the simulated environment can be a three-dimensional environment.

In another aspect the invention can provide a method of operating a flight simulator, said method comprising: receiving, at a flight control system on-board an unmanned aerial vehicle (UAV) when the UAV is in simulation mode, flight control data from a remote controller configured to (1) communicate with and (2) control flight of the UAV when the UAV is in flight mode; generating, at the flight control system, simulated flight data in response to the flight control data from the remote controller; and transmitting, to a display device comprising a visual display, the simulated flight data from the flight control system.

In some cases, the flight control system can be further configured to (3) generate one or more flight signal to be communicated to the one or more propulsion units when the UAV in flight mode. The remote controller can be configured to transmit the simulated flight data to a display device comprising a visual display. The display device can be a mobile device. The remote controller can communicate with the display device via a wireless connection. The visual display can show simulated flight state information of the UAV. The simulated flight state information can include an image of the UAV relative to a simulated environment.

In some embodiments the remote controller can include one or more joystick controls useful for controlling flight of the UAV. The flight control system can receive virtual sensor data from one or more virtual sensors when the UAV is in the simulation mode and uses the virtual sensor data to generate the simulated flight data.

In some cases the method can further comprise an inertial measurement unit configured to receive the virtual sensor data and generate flight state information from the virtual sensor data, and configured to transmit the flight state information to the flight control system when the UAV is in a flight simulation mode. The inertial measurement unit can be configured to receive real sensor data and generate flight state information from the real sensor data, and configured to transmit the flight state information to the flight control system when the UAV is in a flight mode. The flight control system can provide the flight control data to a physical model comprising physical parameter information about the UAV, and wherein the physical model provides physical simulation data to the virtual sensors in response to the flight control data.

Another aspect of the invention can provide an unmanned aerial vehicle (UAV) comprising: a flight control system configured to (1) receive flight control data from a remote controller, and (2) generate simulated flight data in response to the flight control data when the UAV is in a simulation mode; one or more propulsion units configured to (1) actuate and permit flight of the UAV when the UAV is in a flight mode, or (2) remain dormant and not permit flight of the UAV when the UAV is in a simulation mode; and a communication unit configured to transmit the simulated flight data to a display device comprising a visual display.

In some cases, the flight control system can be further configured to (3) generate one or more flight signal to be communicated to the one or more propulsion units when the UAV in flight mode. The remote controller can be configured to transmit the simulated flight data to a display device comprising a visual display. The display device can be a mobile device. The remote controller can communicate with the display device via a wireless connection. The visual display can show simulated flight state information of the UAV. The simulated flight state information can include an image of the UAV relative to a simulated environment.

In some embodiments the remote controller can include one or more joystick controls useful for controlling flight of the UAV. The flight control system can receive virtual sensor data from one or more virtual sensors when the UAV is in the simulation mode and uses the virtual sensor data to generate the simulated flight data.

In some cases the UAV can further comprise an inertial measurement unit configured to receive the virtual sensor data and generate flight state information from the virtual sensor data, and configured to transmit the flight state information to the flight control system when the UAV is in a flight simulation mode. The inertial measurement unit can be configured to receive real sensor data and generate flight state information from the real sensor data, and configured to transmit the flight state information to the flight control system when the UAV is in a flight mode. The flight control system can provide the flight control data to a physical model comprising physical parameter information about the UAV, and wherein the physical model provides physical simulation data to the virtual sensors in response to the flight control data.

Another aspect of the invention can provide a method of operating a flight simulator, said method comprising: receiving, at a flight control system, a flight control signal generated by a remote controller capable of communicating with and controlling flight of an unmanned aerial vehicle (UAV), wherein the flight control signal includes a command for a predetermined flight sequence of the UAV; generating, at the flight control system, simulated flight data for execution of the predetermined flight sequence of the UAV in response to the flight control signal; and displaying, on a visual display of a display device, simulated fight state information of the UAV in response to the simulated flight data.

The flight control system can be on-board the display device. The flight control system can be on-board the UAV. The predetermined flight sequence of the UAV can include an auto-return of the UAV to a starting point of the flight. The predetermined flight sequence of the UAV can include an autonomous take-off sequence of the UAV. The predetermined flight sequence of the UAV includes an autonomous landing sequence of the UAV. The predetermined flight sequence of the UAV includes an autonomous hovering of the UAV. The predetermined flight sequence of the UAV may include a pose-keeping flying of the UAV.

In some cases, the display device can be a mobile device. The remote controller can communicate with the display device via a wired connection. The remove controller can communicate with the display device through a wireless connection. The remote controller can include one or more joystick controls useful for controlling flight of the UAV when the UAV is in flight mode.

In some embodiments the visual display can be a touchscreen. The simulated flight state information can include an image of the UAV relative to a simulated environment. The image can be an animation and the simulated environment can be a three-dimensional environment. The display device can provide a hint to a user of the display device to initiate the predetermine flight sequence. The display device can be configured to receive a selection of a weather parameter, and the simulated flight data can be generated based on the selected weather parameter.

In another aspect the invention can provide A non-transitory computer readable media comprising program instructions for performing a flight simulation, said non-transitory computer readable media comprising: program instructions for receiving, at a flight control system, a flight control signal generated by a remote controller capable of communicating with and controlling flight of an unmanned aerial vehicle (UAV), wherein the flight control signal includes a command for a predetermined flight sequence of the UAV; program instructions for generating, at the flight control system, simulated flight data for execution of the predetermined flight sequence of the UAV in response to the flight control signal; and program instructions for displaying, on a visual display of a display device, simulated fight state information of the UAV in response to the simulated flight data.

The flight control system can be on-board the display device. The flight control system can be on-board the UAV. The predetermined flight sequence of the UAV can include an auto-return of the UAV to a starting point of the flight. The predetermined flight sequence of the UAV can include an autonomous take-off sequence of the UAV. The predetermined flight sequence of the UAV includes an autonomous landing sequence of the UAV. The predetermined flight sequence of the UAV includes an autonomous hovering of the UAV. The predetermined flight sequence of the UAV may include a pose-keeping flying of the UAV.

In some cases, the display device can be a mobile device. The remote controller can communicate with the display device via a wired connection. The remove controller can communicate with the display device through a wireless connection. The remote controller can include one or more joystick controls useful for controlling flight of the UAV when the UAV is in flight mode.

In some embodiments the visual display can be a touchscreen. The simulated flight state information can include an image of the UAV relative to a simulated environment. The image can be an animation and the simulated environment can be a three-dimensional environment. The display device can provide a hint to a user of the display device to initiate the predetermine flight sequence. The display device can be configured to receive a selection of a weather parameter, and the simulated flight data can be generated based on the selected weather parameter.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
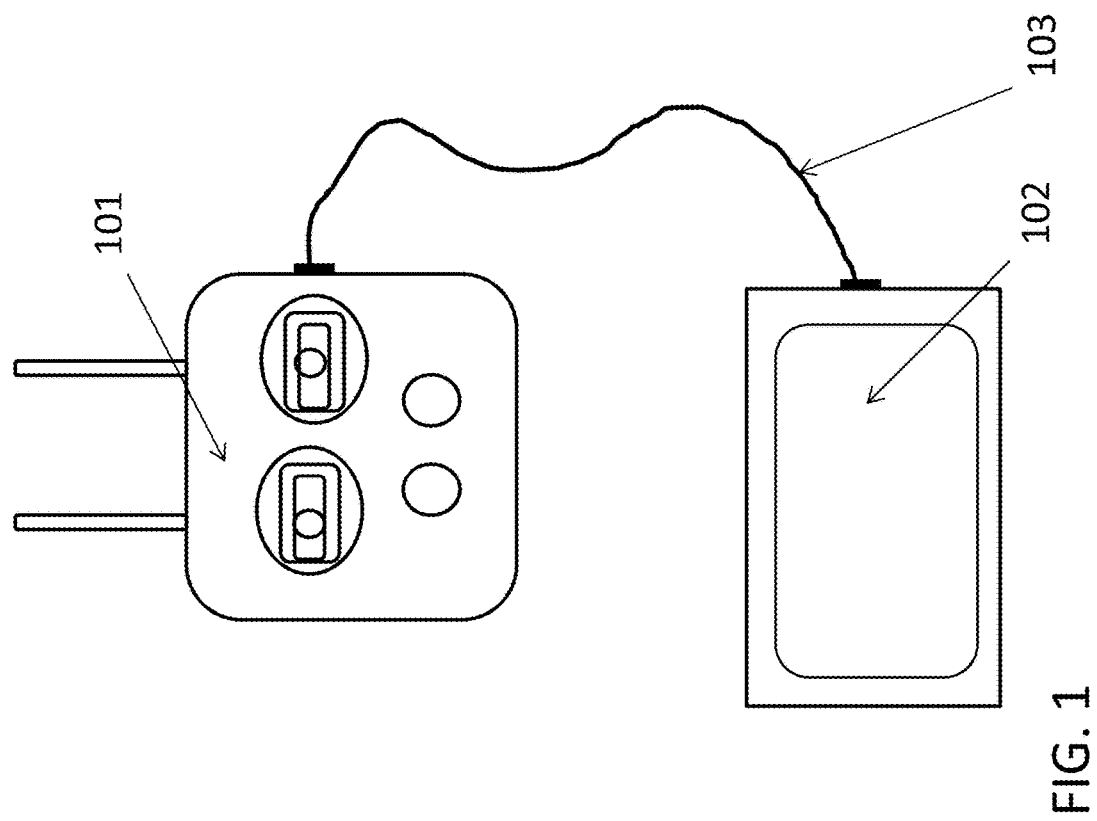
FIG. 1 shows an example of hardware components than can be included in a flight simulation system.
Figure 1:
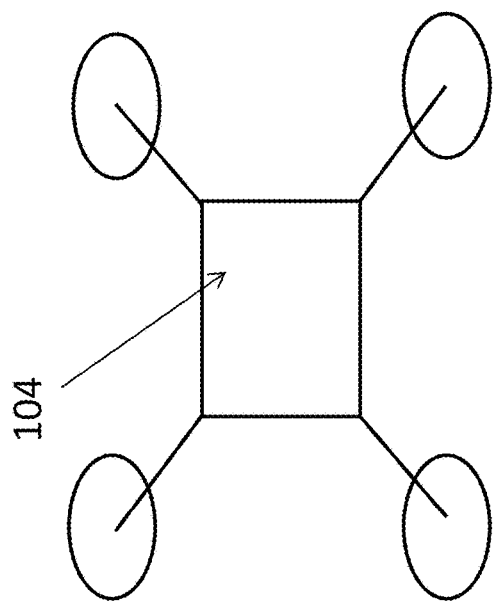

The systems, devices, and methods of the present invention provide mechanisms training a user to fly and control an unmanned aerial vehicle (UAV) in a virtual environment. The skills obtained by the user from flying the UAV in the virtual environment can be directly applicable to flying a UAV in a real environment. The systems, devices, and methods of the present invention further provide a simulation platform that employs at least some components that can be used for real flight of the UAV. Description of the UAV may be applied to any other type of unmanned vehicle, or any other type of movable object.

In some cases one or more functions of the UAV can be controlled at least partially by an input from a user. The input from a user can be provided to the UAV through a remote controller. Providing input to control one or more functions of the UAV through a remote controller can be difficult. In some cases a user that is unfamiliar with providing input to control one or more functions of the UAV through a remote controller can fail to achieve a desired result using a remote controller. Failure to achieve a desired result using a remote controller can result in damage to the UAV and/or loss of the UAV in an unknown environment. It can be advantageous to provide a simulation exercise in which a user can train and practice controlling a virtual UAV in a virtual environment using a remote controller. The remote controller may be the same remote controller used to fly a UAV in a real flight environment.

A real flight environment can be an outdoor, indoor environment, or mixed outdoor and indoor environment where a UAV can be operated. Operation of the UAV can be flight or other locomotion of the UAV. A real environment can exist in real time and space. A real environment may be tangible in a physical world. A virtual or simulated environment can be an environment that exists in a computer software structure. The virtual or simulated environment can be created from one or more inputs from a user, software developer, or information from a database. A virtual or simulated environment can be a representation of an environment that exists in real space and time or an imaginary environment that does not exist in real space and time. A virtual or simulated environment can comprise defined boundaries, obstacles, and surfaces. The virtual or simulated environment can have defined medium to support flight of the UAV, for example, the medium can be air. The medium can exist and be defined mathematically in the virtual environment. In some embodiments, the virtual environment does not exist in the physical, tangible world.

A remote controller that is configured to control a virtual UAV in a virtual environment, simulation, can be the same or similar to a controller that is used to control a real UAV in a real environment. Providing the same controller for use in both the simulation and the real environment can result in a more realistic training experience for a user. A user can develop muscle memory associated with movement or manipulation of a physical interface on a remote control. Providing an identical remote controller in both a simulation and real flight mode of a UAV can provide the advantage of utilizing the muscle memory formed in the simulation mode for use in the real flight mode. Muscle memory can increase reaction time, precision, and accuracy in flight mode. Providing the same controller for use in both the simulation and flight mode of the UAV can familiarize a user with the sensitivity of the controls on the remote control. For example, a user can become familiar with the response time of the UAV to an input from the remote control. In another example, a user can become familiar with the magnitude of a response relative to movement of a physical interface on a remote control. Additionally, a user can memorized the location of knobs, buttons, joysticks, and/or dials on a remote controller in simulation mode, in flight mode the memorized location of these components can increase reaction time and therefore increase a user's ability to control the UAV.

In some cases, a UAV can be configured to perform autonomous tasks. An autonomous task can be initiated by a user. After an autonomous task is initiated by a user a UAV may not require additional control or input from a user while the autonomous task is performed. An autonomous task may cause a UAV to enter a predetermined sequence. The predetermined sequence may include a series of actions that do not require user input. In an example, an autonomous task can be automatic return, pose-keeping flying, GPS flying, autonomous take off, or autonomous landing. In the simulation system provided herein a user can practice instructing a UAV to perform an autonomous task. The instruction to perform an autonomous task can be provided to the UAV in simulation mode though an identical interface as the interface used in flight mode. The interface can be a remote control.

The UAV simulation may use a display device to depict a virtual simulated environment of the UAV. An application may run on a display device, such as a mobile device. The application may show a three-dimensional virtual environment and flight of the UAV within the environment. As previously described, a flight control system may be used to control flight of the UAV within the virtual environment. The flight control system may be on-board the UAV, on-board the display device, or on any other device. The flight control system may use data from virtual sensors to generate a simulated flight. In some instances, a UAV may operate within a flight mode or a simulated mode. When in flight mode, the UAV flight control system may send signals to propulsion units of the UAV to effect flight of the UAV.

When in simulated mode, the UAV flight control system may send signals to a physical model without sending signals to the propulsion units. The physical model may provide virtual feedback, which may help define the simulated flight of the UAV.

Provided herein are systems, methods, and devices configured to provide a realistic flight simulation. A realistic flight simulation can be a flight simulation that comprises components used in a real flight operation of a vehicle. Possible components of a realistic flight simulation system are shown in FIG. 1. A realistic flight simulation system can comprise a remote controller 101, display device 102, connector 103 between the remote controller and the display device, and UAV 104.

The remote controller 101 can be the same remote controller that is used to control a UAV 104 in a real flight operation. In some cases the remote controller can be a similar or identical copy of a remote controller that is used to control a UAV in a real flight operation. The remote controller can have any combination of physical user interface mechanisms. A physical user interface mechanism can be a component on the remote controller that a user touches or manipulates to control at least one function of the UAV. In an example, a physical user interface mechanism can be a button, a joystick, a roller ball, a touch screen, a switch, a dial, or a knob. In some cases the physical user interface can comprise two or more joysticks. The joysticks may move vertically and horizontally. The joysticks may be used to control pitch, roll, yaw, and/or vertical velocity. The physical user interface mechanisms can be configured such that a user can control movement of the UAV about a roll, yaw, and/or pitch axis. The physical user interface mechanisms can be manipulated by a user to cause translation of a UAV in a direction along a plane in three-dimensional space. The physical user interface can be further configured to provide a user control over the flight of the UAV. Controlling flight of the UAV can include controlling speed, power, throttle, and/or elevation of the UAV. In some cases, the physical user interface can provide mechanisms to control non-flight actions of the UAV. A non-flight action can be movement of a sensor or payload on-board the UAV. The non-flight action may include actuation of a carrier of a UAV that may be configured to carry a payload. Another example of a non-flight action can be collection and/or reporting of data collected by a sensor on-board the UAV. Additionally, the physical user interface can provide mechanisms to initiate an autonomous action or task by the UAV. In an example, an autonomous task or action can be automatic return, pose-keeping flying, GPS flying, autonomous take off, or autonomous landing.

The remote controller 101 can connect to a display device through 102 a wired or wireless connection. The display device 102 can be a device that comprises a computing component and a visual display. The computing component can comprise one or more processors, one or more memory storage devices. The processors may be configured to execute instructions in accordance with non-transitory computer readable medium. The memory may comprise non-transitory computer readable media comprising code, logic, or instructions for performing one or more steps described herein. The display device 102 can comprise a non-transitory computer readable media comprising program instructions for performing a flight simulation. The display device 102 can be a mobile device, such as a smart phone. In some cases, the display device 102 can be a desktop computer, laptop computer, tablet, or virtual reality headset. Alternatively, the display device 102 can be the combination of a computing component and a visual display where a visual display can be a touchscreen, projector, LCD screen, plasma screen, LED or OLED screen, a television, or a monitor. The display device can provide a visual and/or textual representation of flight data during a flight simulation. In some cases, the display device can additionally provide audio feedback during a flight simulation. The display device can be configured to receive user input through a user interactive component, such as a touchscreen, switch, button, key, knob, mouse, pointer, trackball, joystick, touchpad, inertial sensors (e.g., accelerometers, gyroscopes, magnetometers) microphone, visual sensor, or infrared sensor. The user interactive component may receive touch inputs, positional inputs, audio inputs, or visual inputs.

The remote controller 101 can be in communication with the display device 102. Communication between the remote controller 101 and the display device 102 can be provided through a wired or wireless connection. A wireless connection can be provided between the remote controller 101 and the display device 102 through an RF connection, IR connection, Wi-Fi network, a wireless local area network (WLAN), a cellular network, or any other available wireless network. Alternatively, a wired connection can be provided between the remote controller 101 and the display device 102 through a permanent wire connection, coaxial cable connection, Firewire connection, MIDI connection, eSTATA connection, an Ethernet connection, or any other available wired connection that permits data transmission. In some cases, the wired connection can be a connection through a USB cable 103.

The remote controller 101 and/or the display device 102 can be in communication through a wired or wireless connection with a flight control system or flight controller. The flight control system can be on-board or off-board a UAV 104. In some cases, the flight control system can be on-board the display device. The flight control system can be configured to generate flight control data in response to an input from the controller and/or the display device. The flight control system can receive input from a user through the remote controller and/or the display device. The flight control system can communicate the input to a system of one or more components that can generate real or virtual sensor data and communicate this data back to the flight control system. Based on the real or virtual sensor data, the flight control system can generate flight data and transmit the flight data to one or both of the remote controller 101 and the display device 102. The process of generating real or virtual sensor data and the distinction between real and virtual sensor data will be described in detail below.

A UAV can be operated in a first or second operation mode. In a first operation mode the UAV can be flown in a real environment. In the first operation mode the UAV can be flown in the real environment by receiving instructions or input from a remote controller. The first operation mode can be a flight mode.

The second mode can be a simulation mode. In the simulation mode the UAV may fly within a virtual environment without flying in a real environment. The UAV may remain physically dormant and may not be self-propelled within the real environment. One or more propulsion units of the UAV may not operate while the UAV is in the simulation mode. In the second operation mode one or more components on-board the UAV can contribute to a flight simulation. In some cases, none of the components on-board the UAV can be used in the flight simulation. In a second operation mode a virtual UAV can be flown in a virtual or simulated environment. The virtual UAV and the virtual environment can exist mathematically in a simulated space. The virtual UAV can have the same functionality in the virtual environment as the real UAV in the real environment.

The UAV can comprise a receiver configured to receive a mode signal that indicates that the UAV is in a first or second mode. The mode signal can be provided by the remote controller, the display device, or a separate device in communication with the receiver. In some cases, the signal can be provided through a hardware component on the UAV. The hardware component can be manipulated by a user to provide the signal to the UAV. For example, the hardware component can be a switch, button, or knob that can be physically displaced between a first and second position to provide a signal indicating a first or second mode. In another example, a flight mode can be a default mode and the UAV can operate in the flight mode unless a mode signal indicates a change to the simulation mode.

A user can initiate a change between flight and simulation modes. In an example, a user can choose to use the UAV in simulation mode. To use the device in simulation mode a user can provide a mode signal to the receiver to indicate that the UAV should operate in simulation mode. The user can provide the mode signal through a physical interface on the UAV (e.g. switch, button, lever, or knob). In some cases, the user can provide the mode signal through the remote controller through a physical interface mechanism on the remote controller. An alternate device or remote, different from the remote controller used for flight control, can be used to send a mode signal to the UAV. Alternatively, the display device can be used to send a mode signal to the UAV. When the display device is turned on it may automatically connect to a communication unit on-board the UAV. The UAV can automatically default to simulation mode whenever the display device is in communication with the UAV. In some cases, the UAV may not automatically default to simulation mode whenever the display device is in communication with the UAV. The user can communicate with the receiver on-board the UAV to send a mode signal through the display device using a touch screen or physical mechanism (e.g. button, knob, switch, or lever). Similarly, the UAV can be operated in flight mode by sending a signal to the receiver though the remote controller, display device, a physical interface on the UAV, or through another device or remote. In order to change from one mode to another the UAV may need to be landed. In order to change from one mode to another, one or more propulsion units on the UAV may need to be powered off.

When the UAV is operating in a flight mode, the remote controller can provide an input to the flight control system. The input provided by the remote controller can be flight control data. Flight control data can be an instruction that changes a flight path or causes a flight event to start or stop. In an example, flight control data can be an instruction to start a propulsion system, stop a propulsion system, increase power to a propulsion system, decrease power to a propulsion system, change the heading of a UAV, change the elevation of the UAV, turn on a sensor on a UAV, turn off a sensor on a UAV, report sensor data from a sensor on-board the UAV, or initiate an autopilot function on the UAV. The flight control system can receive and process the flight control data using one or more processors. The processors can be configured to, individually or collectively, transform the flight control data into an instruction to alter, initiate, or cease a flight action. The processors can transform the flight control data identically in both flight and simulation modes of operation.

When the UAV is in flight mode, the flight control data can be communicated to one or more propulsion units of the UAV. A flight control system on board the UAV can be configured to generate one or more flights signals to be communicated to the one or more propulsion units when the UAV is in flight mode. The one or more propulsion units can be configured to actuate and permit flight of the UAV in response to the flight signals when the UAV is in flight mode. The one or more propulsion units can further be configured to remain dormant and not permit flight of the UAV when the UAV is in simulation mode. In simulation mode, the one or more propulsion units may not receive a flight signal. Since the propulsion units do not receive a flight signal in the simulation mode, they may remain dormant.

Optionally, in a flight mode, the remote controller can be configured to control actuation of a carrier that holds a payload of the UAV. A payload can be an external sensor, for example a camera unit. The payload can be movable independent of the motion of the UAV. Optionally, in simulation mode, the remote controller can be configured to virtually control actuation of the carrier without physically causing actuation of the carrier on-board the UAV. Similarly to the propulsion units, when a UAV is in flight mode, a carrier, payload, sensor, and/or other component of the UAV may receive a control signal from one or more control systems on-board the UAV, which may effect operation of the carrier, payload, sensor, and/or other component. When the UAV is in simulation mode, the carrier, payload, sensor and/or other component of the UAV does not receive a control signal from one or more control systems on-board the UAV, so that operation of the carrier, payload, sensor and/or other component is not effected. Virtual operation of the carrier, payload, sensor, and/or other component may be effected for the flight simulation without causing physical operation. Thus, operation of other features of the UAV may be simulated using the flight simulator. For example, a user may practice controlling direction of a camera on-board of a UAV in a flight simulation using a camera control system that may be on-board the UAV, carrier, display device, or other device. This may affect the direction of images captured in the flight simulation without effecting actuation of a camera or carrier on-board the UAV. Alternatively, only flight is simulated using the flight simulator.

When the UAV is in simulation mode the input provided by the remote controller can be flight control data. Flight control data can be an instruction that changes a flight path or causes a flight event to start or stop. In an example, flight control data can be an instruction to start a propulsion system, stop a propulsion system, increase power to a propulsion system, decrease power to a propulsion system, change the heading of a UAV, change the elevation of the UAV, turn on a sensor on a UAV, turn off a sensor on a UAV, report sensor data from a sensor on-board the UAV, or initiate an autopilot function on the UAV. When the UAV is in simulation mode the flight control data may not be communicated to the propulsion units of the UAV.

Figure 2:
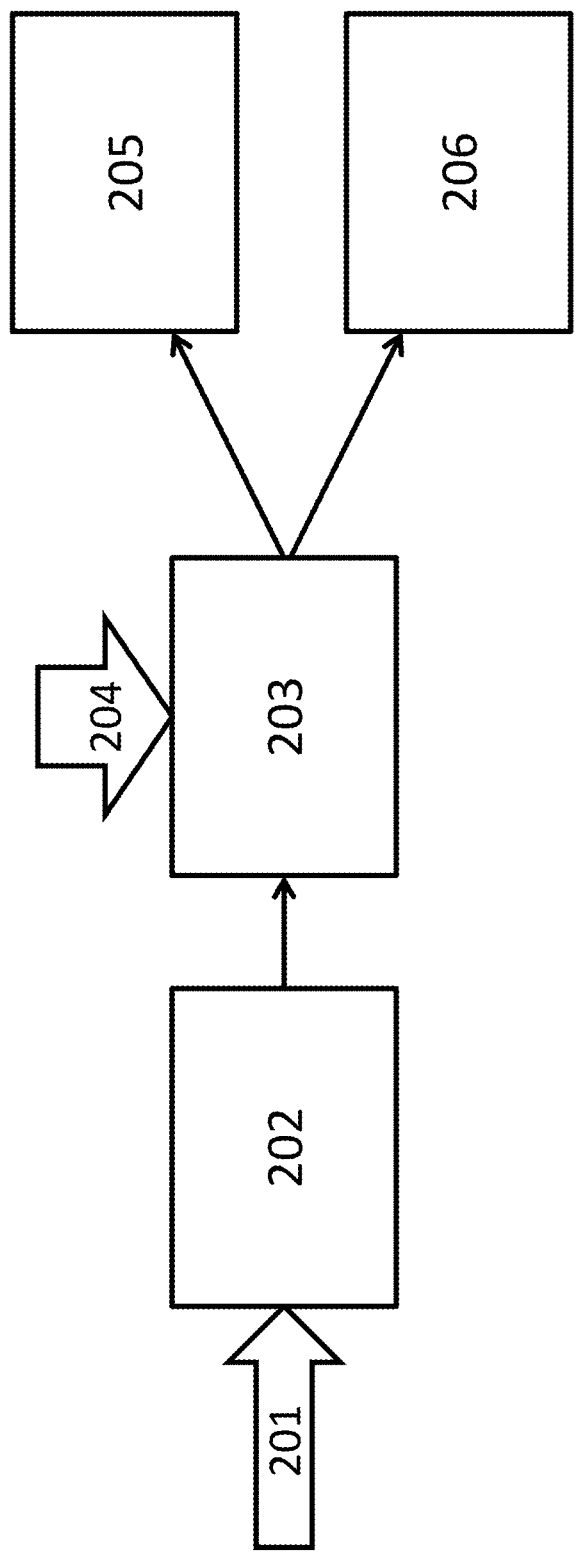
FIG. 2 shows an example of a signal transmission pathway to change from a flight mode operation to a simulation mode operation.

FIG. 2 shows a flow chart that describes an example of a flow of data provided to operate a UAV in a first or second mode. Flight data 201 can be communicated to the flight control system 202. Flight data 201 can be communicated to the flight control system 202 from the remote controller and/or the display device. The flight control system can be configured to provide the flight data to an output switcher 203. The flight control system can process or transform the flight data 201 using one or more processors prior to providing the flight data to the output switcher 203. The output switcher 203 can direct the flight data 201 to the one or more propulsion units 205 or to a physical model 206 based on a mode signal 204. The mode signal 204 can be provided by a user through the remote controller, the display device, a physical mechanism on-board the UAV, or from another device or remote. When the mode signal 204 indicates that the UAV is in flight mode, the output switcher 203 can direct the flight data to one or more propulsion units 205. When the mode signal 204 indicates that the UAV is in simulation mode, the output switcher 203 can direct the flight data to a physical model 206. The flight data may not be communicated to one or more propulsion units in simulation mode.

Any descriptions of propulsion units may be applied to a carrier, payload, sensor, and/or other component of the UAV for differentiating between a flight mode and a simulation mode of the UAV. For example, in a flight mode, an output switcher may direct a control signal to a carrier to cause movement of a payload relative to the UAV. In a simulation mode, the output switcher may instead direct the control signal to a virtual carrier without directing a control signal to the physical carrier. The virtual carrier may or may not be part of the physical model.

The physical model can be a mathematical model configured to simulate physical simulation data in response to flight data. The physical model can comprise a non-transitory computer readable media comprising program instructions for performing a flight simulation. The physical model can generate physical simulation data using constant and variable inputs. A constant input can be a property of the UAV. Constant properties can be fixed for a specific UAV or a specific model of UAV. In an example a constant property can be one or more dimensions of the UAV, aerodynamic properties of the UAV, weight of the UAV, the make and model of the motor on the UAV, and/or maximum and minimum thrust that can be provided by one or more propulsion units on board the UAV. The physical model can be configured to calculate a moment of inertia based on the dimensions and weight distribution of a specific UAV or specific model of a UAV. Variable properties can be the independent of the specific model or specific UAV. Variable properties can be dependent on weather or location. In an example, variable properties can be wind speed, wind direction, humidity, air density, and/or temperature. Variable properties can be chosen randomly by the physical model or they may be input by a user. In some cases, the variable properties can be derived from a prior real flight performed by the UAV. In an example, if the UAV is used in a real flight in a real environment the variable properties experienced in the environment can be recorded and stored on a memory storage device off-board or on-board the UAV. After the real flight the recorded variable properties can be used in a simulated flight to recreate the real environment as a simulated environment.

The physical model can accept the constant and variable inputs to generate an output using one or more mathematical models. The physical model can run on a computer system that can comprise one or more processors and one or more memory storage units. The physical model may be run in accordance with non-transitory computer readable media. The non-transitory computer readable media may comprise code, logic, or instructions for performing one or more steps described herein. The processors may, individually or collectively, execute steps in accordance with the non-transitory computer readable media.

A user can select a weather condition through the user interface provided on the display device. The weather condition can be provided as an input to the physical model. In an example, a weather condition can result in a constant or variable force on the UAV, for example a head or tail wind. The physical model can output physical simulation data. The physical simulation data can be one or more physical parameters that may act on the UAV. In an example the physical model can output one or more forces acting on the UAV. The forces can be any one or combination of a drag force, lift force, gravitational force, normal force, tangential force, or any other force known to act on the UAV. The physical model can provide as an output, a pressure profile along in the vicinity of the surface of the UAV. The physical model can also provide as an output, a velocity profile of the flow in the vicinity of the UAV.

The physical model may be provided on-board the UAV or on-board the display device. In some embodiments, the flight control system and the physical model may be on-board the UAV. This may advantageously permit the flight simulation system to leverage existing processes on-board the UAV. In other embodiments, the flight control system and the physical model may be on-board the display device. This may advantageously permit a flight simulation that may utilize the remote controller without requiring the presence or connection of the UAV. In other instances, the flight control system may be on-board a UAV while the physical model is on-board the display device, vice versa, or any other combination of distributed processes on-board the UAV and the display device.

Figure 3:
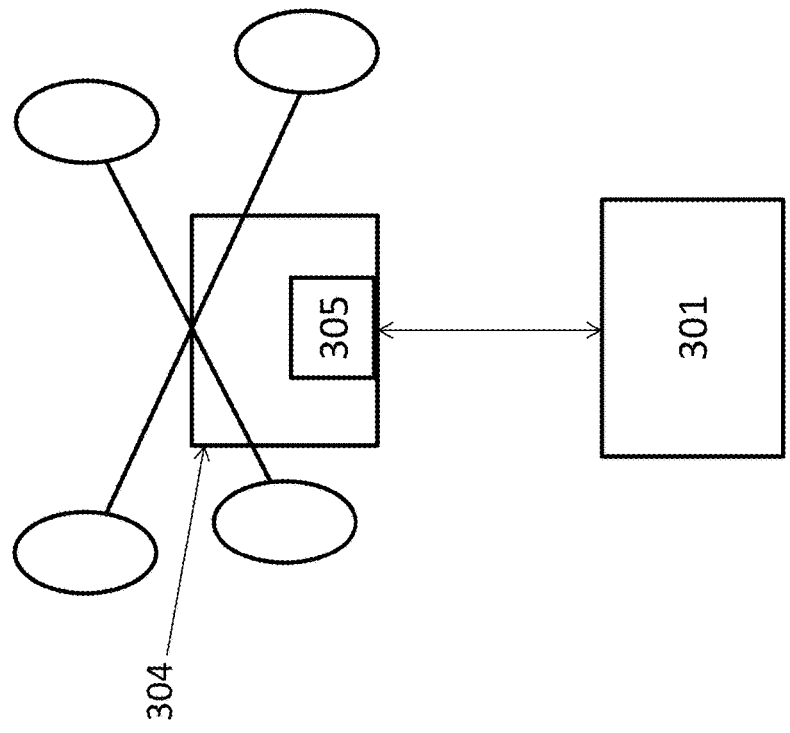
FIG. 3 shows a simulation configured to input parameters to a physical model pertaining to a first or second unmanned aerial vehicle (UAV).
Figure 3:
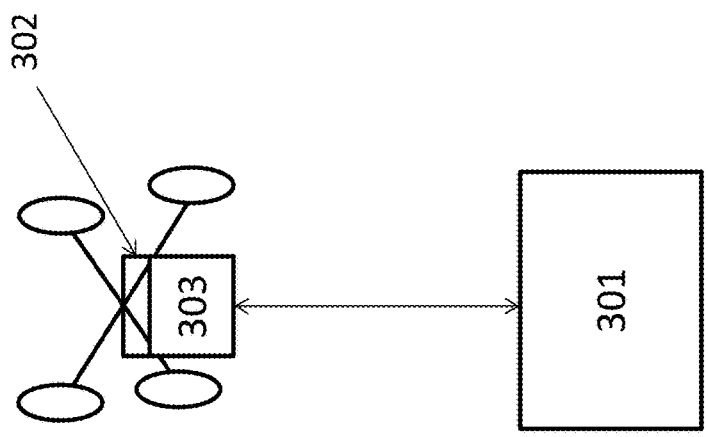

The physical model can be provided for a specific UAV or a specific model of a UAV. In some cases the physical model can provide parameters corresponding to a default UAV make and/or model. In some cases, the physical model can be on-board a UAV. The physical model can be programmed to provide physical parameters corresponding to the UAV on which it is on-board. For example, as shown in FIG. 3, connection to a first or second UAV with a controller can result in connection to a physical model with fixed variables corresponding to the first or second UAV. A controller 301 can be in communication with a first UAV 302 comprising an output switcher that can be in communication with a first physical model 303. The first physical model can be configured to simulate flight data outputs using fixed parameters corresponding to the first UAV. For example, the first physical model can be configured to use the weight, dimension, aerodynamic shape, motor strength, motor speed, and other power properties corresponding to the first UAV in a mathematical model to determine one or more outputs. In a second case, the same controller 301 can be in communication with a second physical model on board a second UAV. The second UAV can have a relatively different size, shape, weight, and/or power system compared to the first UAV. A controller 301 can be in communication with the second UAV 304 comprising an output switcher that can be in communication with the second physical model 305. The second physical model can be configured to simulate flight data outputs using fixed parameters corresponding to the second UAV. For example, the second physical model can be configured to use the weight, dimension, aerodynamic shape, motor strength, motor speed, and other power properties corresponding to the second UAV in a mathematical model to determine one or more outputs.

In an alternate embodiment, the physical model can be off-board the UAV. The physical model can be on-board a display device. When the physical model is on-board a display device a user can choose to run a simulation using a UAV of a specified make and/or model. The physical model can have fixed physical parameters corresponding to one or more possible makes and/or models of a UAV saved on a memory storage device on or off-board the display device. A user can choose to use the saved fixed physical parameters corresponding to the one or more possible makes and/or models of UAV saved on the memory storage device or a user can input the fixed physical parameters directly into the physical model.

The physical model can be configured to generate as an output the expected response of a flight control input on the UAV. The output can be specific to a UAV with fixed physical parameters (e.g. dimension, weight, aerodynamic cross section, and/or motor specifications). The expected response to a flight control input can be dependent on the physical parameters of the UAV. For example, a heavier UAV can accelerate slower than a relatively lighter UAV. Similarly, a UAV with a stronger (e.g. higher torque) motor can accelerate faster than a UAV with a relatively weaker motor.

Additionally, the physical model can calculate non-flight parameters. In an example, a non-flight parameter can be battery usage rate and remaining battery life. The battery usage can be calculated as a function of the UAV specifications (e.g. dimension, weight, aerodynamic cross section, and/or motor specifications), the flight control data, and the variable parameters in the simulated environment. The variable parameters can influence the power requirements of the UAV and therefore influence the battery usage rate. For example, a simulated environment with a strong headwind can drain the battery than a simulated environment without a headwind or with a tail wind. Similarly, the flight control data can influence the battery usage rate. For example, operating the UAV at a relatively higher speed can drain the battery faster than operating the UAV at a relatively lower speed. Another example of a non-flight parameter that can be calculated by the physical model is wearing of parts on-board the UAV. The physical model can calculate forces that act on the UAV in the simulated environment and determine when a part or parts experience damage as a result of the forces.

The physical model can provide one or more outputs to a virtual sensor. The virtual sensor can be configured to generate virtual sensor data based on one or more outputs from the physical model simulation data. At least a fraction of the virtual sensor output can mimic data that would be generated by real sensors on-board the UAV during a flight mode operation of the UAV in a real environment. A virtual sensor can generate location data. Location data can be one or more distances between the UAV and obstacles or surfaces in the simulated environment. In a flight mode operation location data can be generated by a radar signal, sonar signal, or a global positioning software (GPS) signal. A virtual sensor can also generate visual data. In a flight mode visual data can come from a vision sensor. A vision sensor can be a monocular camera, stereo vision camera, radar, sonar, or an infrared camera. A virtual sensor can generate data that describes movement of the UAV and/or forces acting on the UAV. In a flight mode a real sensor configured to detect movement of the UAV and/or forces acting on the UAV could be a gyroscope, magnetometer, and/or an accelerometer. Real sensor data may come from a hardware driver. Data may be converted to a general type form. For example, acceleration data may be provided in a float type (e.g., 3 float type), and a buffer may be defined (e.g., float acc_raw_data[3]). In a flight mode, the data may be filled by the hardware driver. In a simulation mode, this data may be filled by the physical model simulation program. Examples of sensors that may be provided as real physical hardware in flight mode, and which may be simulated by a physical model in a simulation mode, may include accelerometers, gyroscopes, magnetometers, GPS, and/or pressure sensors. The data format of the virtual sensors may be a same format as a hardware driver output. For instance, a float type format may be used for both virtual and real sensors.

The sensor data can be provided to an inertial measurement unit. The inertial measurement unit can be on-board the UAV. The inertial measurement unit (IMU) can be configured to interpret the sensor data to determine and generate flight state information using the sensor data. The IMU can interpret sensor data from virtual or real sensors when the UAV is in simulation or flight mode, respectively. The IMU can interpret and/or process the sensor data from the real or virtual sensors to generate flight state information. Flight state information can include attitude, acceleration, speed, gyroscopic information, pressure, spatial disposition of the UAV, location (e.g. GPS data) data. The IMU can provide the flight state information to the flight state control system.

Figure 4:
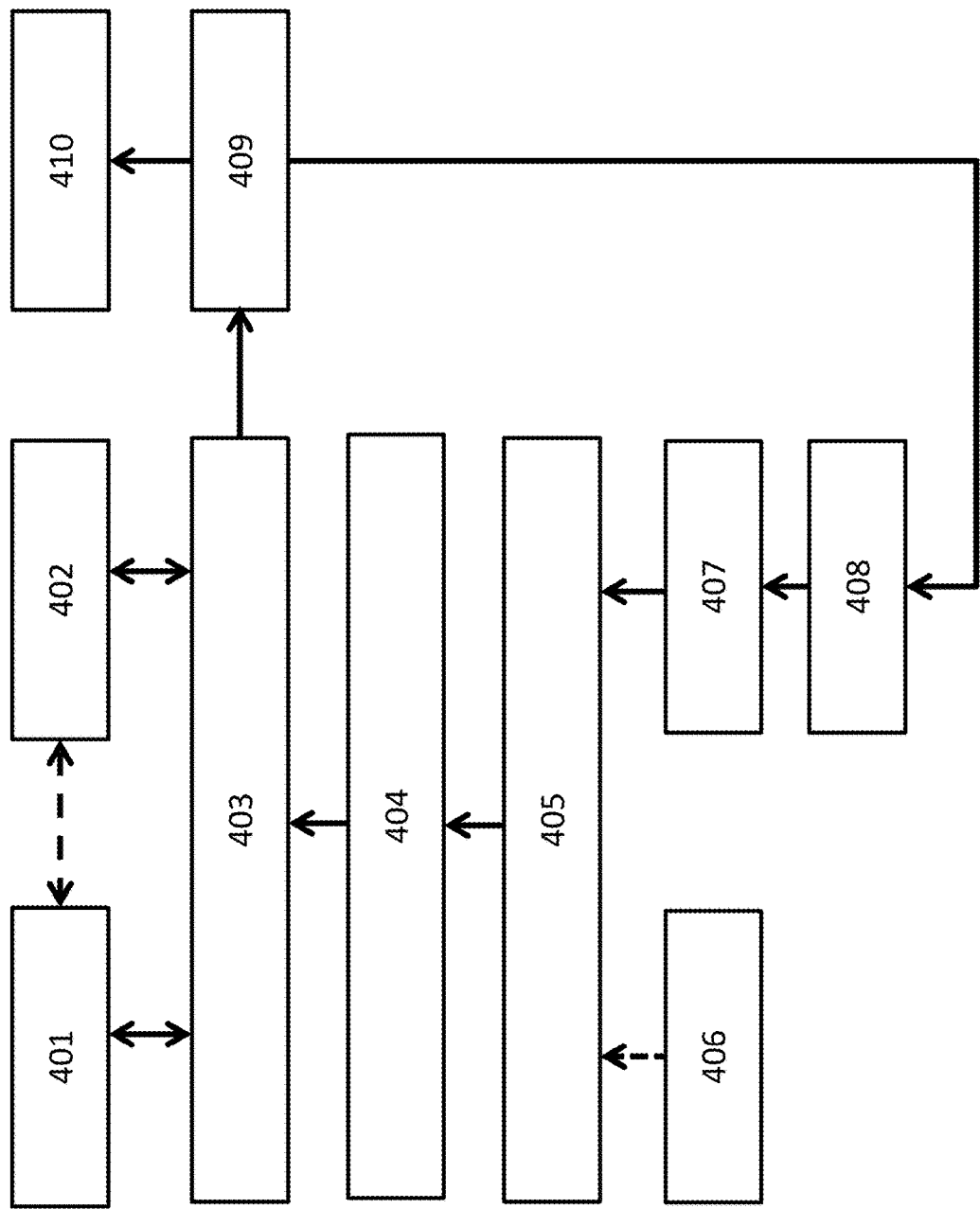
FIG. 4 shows an overall signal transmission pathway for a simulation or flight mode operation.

The overall system and examples of communication between components are shown in FIG. 4. The system can comprise a remote controller 402 and a display device 401. Either or both of the remote controller 402 and the display device 401 can be in communication with a flight control system or flight controller 403. The remote controller 402 may or may not modify flight data provided by the flight controller 403. The remote controller and/or the display device can be in communication with the flight controller or flight control system 403 through a wired or wireless connection. In a first scenario, the display device 401 can communicate with the remote controller 402 and the remote controller 402 can communicate with the flight control system 403. The flight control system 403 can receive an input from the remote controller 402 and transmit an output to the remote controller 42; the remote controller 402 can further transmit the output to the display device 401. In a second scenario, the remote controller 402 can provide and input to the display device 401 and the display device 401 can transmit the input to the flight control system 403. The flight control system 403 can transmit an output to the display device 401 and the display device can transmit the output to the remote controller 402. In a third scenario, both the remote controller 402 and the display device 401 can independently send and receive inputs and outputs, respectively, to the flight control system 403.

The display device 401 may only be in communication with the flight controller 403 when the UAV is operating in simulation mode. When the display device 401 is connected to the flight controller 403 while the UAV is operating in simulation mode the display device can be programmed to execute a first software program. During simulation mode the display device 401 can run a first software program that provides a visual, textual, and/or audio representation of the flight data. In some cases, the display device 401 can be in communication with the flight controller 403 when the UAV is operating in flight mode. The display device can be programmed to execute a second software program when the UAV is in flight mode. During flight mode the display device 401 can run a second software program that provides real flight data. The remote controller 402 can be in communication with the UAV in simulation mode or flight mode. The flight control system 403 can receive a mode signal from either or both of the remote controller 402 or the display device 401. Alternatively, the flight control system 403 can receive a mode signal through a physical input from a user corresponding to manipulation of a mechanism (e.g. switch, button, knob, or dial) on the UAV. The flight control system 403 can communicate the mode signal to an output switcher 409. The flight control system can also receive flight control data from either or both of the remote controller and the display device. The output switcher 409 can determine whether the flight control data is communicated to the physical model 408 or one or more propulsion 410 units on-board the UAV.

When the mode signal received by the output switcher 409 indicates that the UAV is in flight mode the output switcher 409 can communicate the flight control data to one or more propulsion units 410 on-board the UAV. The one or more propulsion 410 units can comprise a motor. In some cases the output switcher 409 can communicate the flight control data to an electronic speed control unit in flight mode. The electronic speed control unit can be a circuit configured to control the output of a motor connected to the one or more propulsion units. When the UAV is operated in flight mode real sensors 406 on-board the UAV can collect real sensor data. The real sensor data can be communicated to a sensor layer 405. The sensor layer 405 can be a module configured to preprocess or label sensor data and transmit the sensor data to an inertial measurement unit (IMU) 404. The IMU can further process the sensor data to generate parameters that can be used by the flight controller 403. The IMU 404 can generate flight data from real sensor data or virtual sensor data. Real sensor data can be data generated by sensors on or off-board the UAV when the UAV is operating in flight mode. The sensors on or off-board the UAV may Virtual sensor data can be data generated by a virtual sensor while the UAV is operating in simulation mode. A virtual sensor can be one or more processors configured to transform an output from the physical model into a virtual sensor data output. The IMU 404 can transmit the generated flight data to the flight controller 403. The flight controller 403 can provide feedback to the remote controller 402 when the UAV is in flight mode. The feedback provided to the remote controller 402 from the flight controller 403 can be simulated flight data. The UAV can comprise a communication unit configured to transmit the simulated flight data to the remote controller 402.

When the mode signal received by the output switcher 409 indicates that the UAV is in simulation mode the output switcher can communicate the flight control data to one or more physical models 408 on-board the UAV. The physical model can calculate an output using a combination of any or all of the flight control data from the remote controller and/or the display device, a prescribed environmental condition (e.g. air pressure, air density, wind speed, ambient temperature, and/or humidity), and/or fixed properties of the UAV (e.g. dimension, weight, power specifications, and/or aerodynamic shape). The output from the physical model can be communicated to one or more virtual sensors 407. The virtual sensors 407 can generate sensor data based on one or more outputs from the physical model 408. The virtual sensors 407 can transmit the generated sensor data to a sensor layer 405. The sensor layer 405 can be a module configured to preprocess or label the virtual sensor data and transmit the virtual sensor data to an IMU 404. The same sensor layer can be used in both simulation and flight mode of the UAV. The IMU 404 can further process the virtual sensor data to generate parameters that can be used by the flight controller. The IMU 404 can generate attitude, acceleration, velocity, gyroscopic data, magnetometer data, pressure, and/or location data (e.g. GPS data). The IMU 404 can transmit the generated data to the flight controller 403. The flight controller 403 can provide feedback to the remote controller 402 and/or the display device 401 when the UAV is in simulation mode. When the UAV is in simulation mode data can be transferred between the remote controller 402 and the display device 401.

In simulation mode the display device can receive simulated flight data from the flight control system on board the UAV. The simulated flight data can be transmitted to the display device directly from the flight controller on board the UAV or the data can be transmitted from the flight controller to the remote controller and then from the remote controller to the display device. The display device can comprise a non-transitory computer readable media comprising instructions for performing a flight simulation. The instructions for performing a flight simulation can be stored locally on a memory storage device in the display device or off-board the display device on another host device in communication with the display device. The display device can comprise a screen that may depict the simulation data in a 2D or 3D rendering. The display device can be a mobile phone (e.g. smart phone), tablet, desktop computer, laptop computer, virtual reality headset, or a television or projector in communication with a computer device. In some cases the display device can comprise a touch screen, an LCD screen, or a plasma screen.

Figure 5:
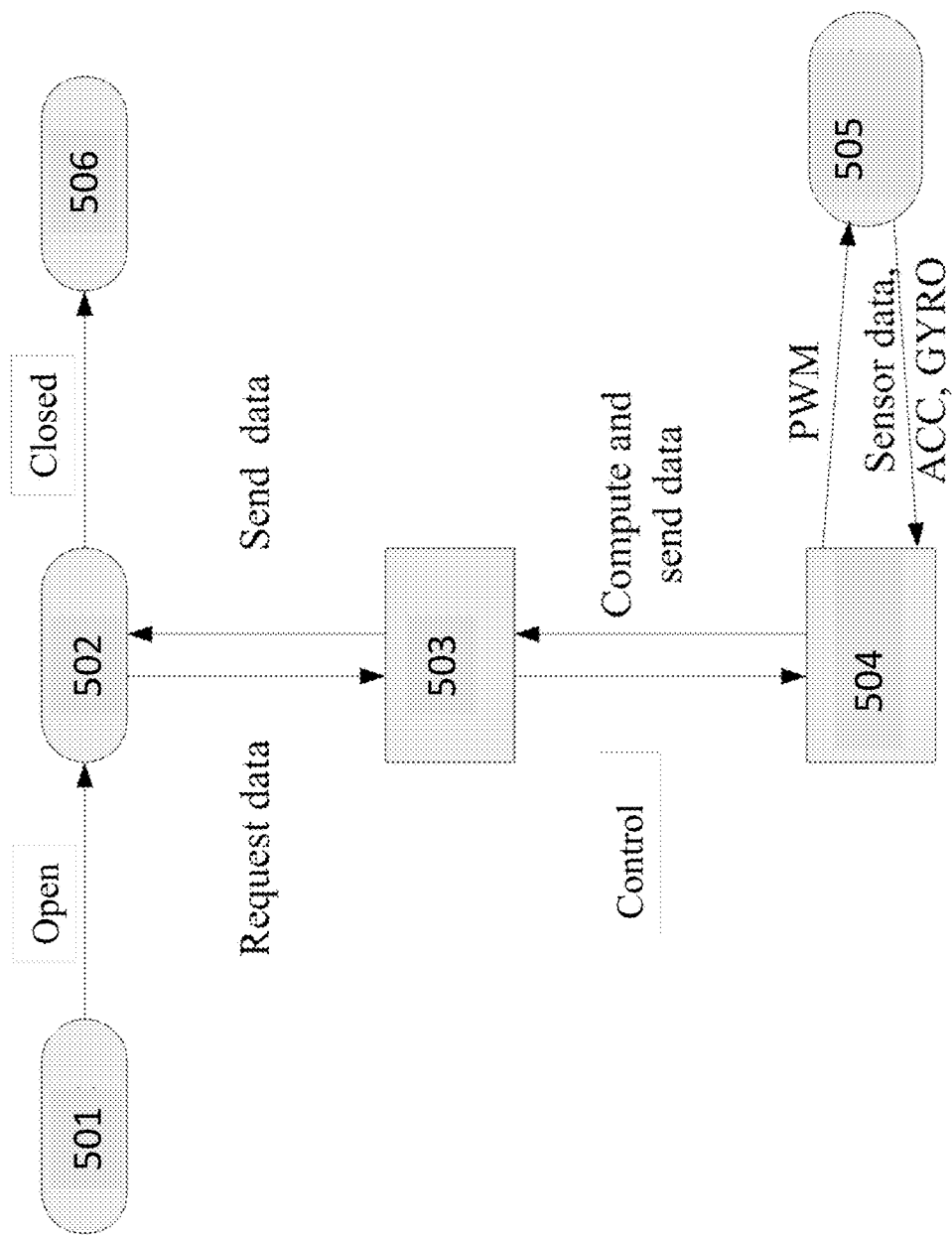
FIG. 5 shows possible signal pathways between system components in a simulation mode operation.

FIG. 5 shows a flow chart of a possible data flow example for a flight simulation mode operation. A user can provide a "start" or "on" command 501 to an application ("app") or software program running on display device 502. When the app is running the display device can request data from a remote controller 503. The remote controller 503 can send data to a flight controller 504 on board a UAV. The data can be a flight control command. A flight control command can be data that is useful for generating simulated flight data on-board the UAV. For example, a flight control command can be an instruction to increase or decrease UAV speed, change in altitude, change heading, rotate in a about a yaw, or roll axis, or to perform an autopilot action. The flight control command from the remote controller can be generated by a user. The flight control command can be input to the remote controller though a physical interface on the remote controller. In an example, a physical interface can be one or more joysticks, roller balls, knobs, button, or a touch screen. The flight controller can send the data from the remote controller to the physical model 505. The flight controller 504 may process the data from the remote controller before transmitting the data to the physical model 505. The physical model 505 can generate virtual flight data using a mathematical model in communication with a virtual sensor model and the IMU on board the UAV. The virtual flight data can be communicated to the flight controller 504. The flight controller 504 can compute and/or process the virtual flight data (e.g. perform a pulse width modulation (PWM)) and transmit the data to the remote controller 503. The remote controller 503 can then transmit the data to the display device 502. The display device 502 can illustrate the data to a user through a display screen or user interface on the display device. The display device 502 can provide a visual display of simulated flight state information. The data can be displayed as a 2D or 3D rendering. In some cases the data can be displayed in a chart or table. When a user finishes a flight simulation a "stop" or "off" signal can be communicated to the display device to terminate the simulation 506.

The display device can communicate with the remote controller though a wired or wireless connection. In some cases a wired connection can be a USB connection. The remote controller can receive simulated flight data from the flight control system on board the UAV. The simulated flight data can be modified by the remote controller before it is communicated to the display device. In some cases, the simulated flight data may not be modified by the remote controller prior to being communicated to the display device. In some cases, a flight simulation can be operated without connection to a flight control system on-board the UAV. The flight simulation can be executed with a connection between a remote controller and a display device. The display device can receive instructions directly from the remote controller and the display device can generate a flight simulation without communicating with the flight controller on-board the UAV.

In some embodiments the remote controller and the display device may not be configured to communicate directly. In an example a display device can be configured to receive simulated flight data directly from a flight control system on-board a UAV. The display device may only receive simulated flight data from the flight control system when the UAV is in simulation mode. The display device can be in communication with the flight control system on-board the UAV through a wired or wireless connection. The flight control system can transmit simulated flight state information to the display device. The UAV can also be configured to communicate with a remote controller configured to control flight of the UAV in flight mode or simulation mode. The same controller can be used to control the UAV in both flight mode and simulation mode. The flight control data communicated to the UAV can be transmitted to the one or more propulsion units on board the UAV in flight mode. In simulation mode the flight control data communicated to the UAV can be transmitted to the physical model to generate simulated flight data. Simulated flight data can be generated by the flight control system from flight control data from the remote controller, virtual sensor data from one or more virtual sensors, and one or more outputs from the physical model on-board the UAV. The display device can display simulated flight state information of the UAV in response to the simulated flight data received from the flight control system.

Simulated flight of a UAV can comprise receiving a flight control signal at a flight control system. The flight control system can be on-board the UAV or on-board the display device. The flight control signal can be transmitted from a remote controller. The remote controller can be operated by a user in real time or the remote controller can receive inputs from a processor pre-programmed by a user to provide a series of flight control signals in response to a start command. The flight control signal can be an instruction to perform a discrete task or action. In an example a discrete task or action can be to increase or decrease speed by a fixed amount or percentage, to turn in a specified direction a specified number of degrees, or to increase or decrease altitude a fixed amount or percentage. In some cases, a flight control signal can include a command for a predetermined flight sequence. In an example a predetermined flight sequence can be an auto pilot function (e.g. auto take off, auto landing, or auto pilot flight for a specified distance), execution of pre-programmed mission, an auto-return of the UAV to a starting point of the flight of the UAV, autonomous hovering of the UAV, and/or pose-keeping flying of the UAV. A pre-programmed mission can include flight to a specific location or locations with our without operation of on-board sensors to collect and/or transmit data from the one or more locations. The flight control system can generate simulation flight data for or pertaining to execution of the discrete task or action or the predetermined flight sequence.

An auto pilot function can be an auto take-off or landing. An autonomous take off can comprise turning on one or more propulsions units and generating a lift force sufficient to leave a surface. Autonomous take off can additionally include adjusting rotation and translation of the UAV to maintain stability. Once the UAV reaches a specified altitude above a take-off surface and achieves stability the UAV can exit the autopilot function and a user can control the UAV. Similarly during an auto landing a UAV can approach a surface while maintaining stability and turn off the one or more propulsion units after landing on a surface. During pose-keeping flight a UAV may fly in a specified direction while maintaining a specified distance from a surface or obstacle.

The simulated flight data can be displayed on a visual display or user interface of the display device. The visual display can be an image of a UAV in a simulated environment. The UAV can be articulated in the display in real time corresponding to flight data provided by the controller. The display can be an image or an animation of the simulated environment in a 3D rendering of the environment. The simulated flight data can be displayed in the form of simulated flight state information. Simulated flight state information can include the location of the UAV in an environment, proximity to features in the environment, velocity of the UAV, acceleration of the UAV, directional heading of the UAV, and/or health of one or more systems on the UAV.

Figure 6:
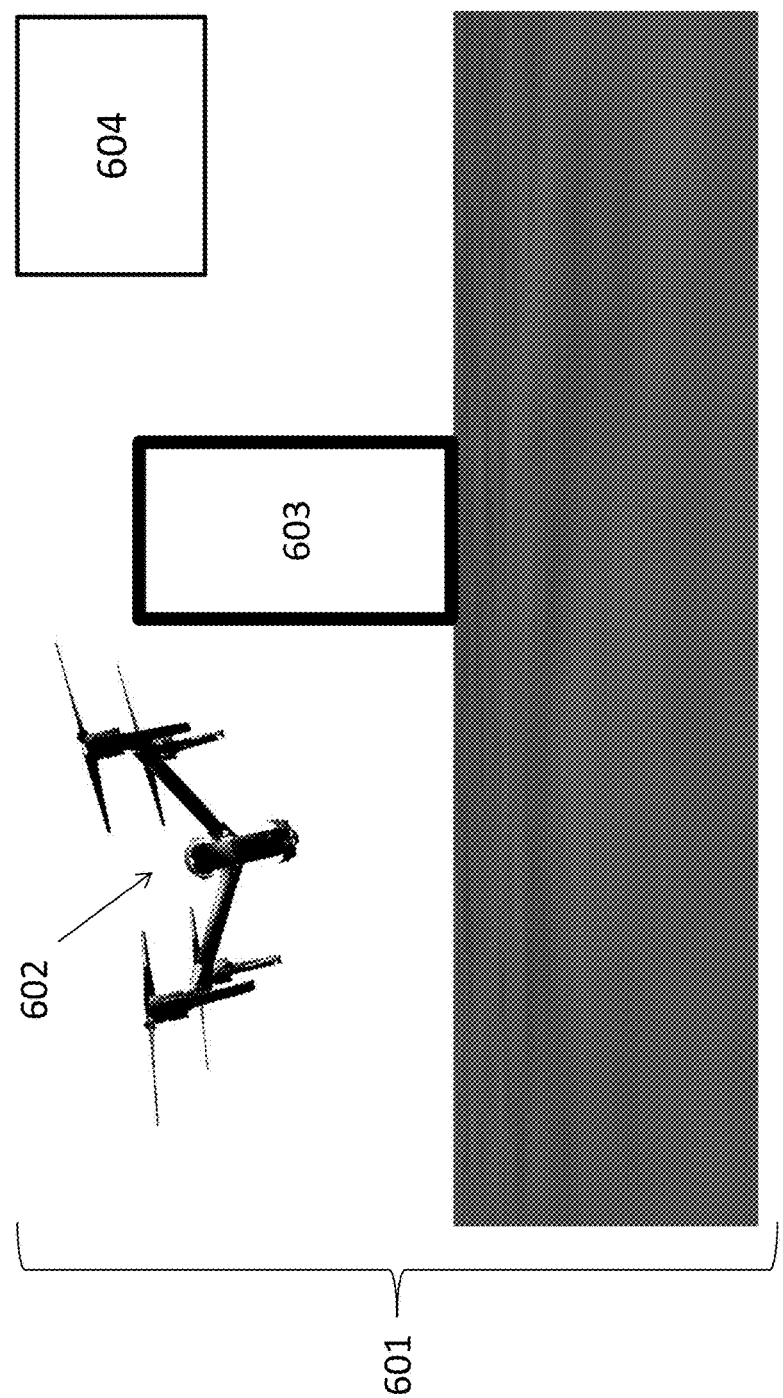
FIG. 6 shows an example of a display on a display device during simulation mode operation.

FIG. 6 shows an example of a data 601 that can be shown on a visual display of a display device during simulated flight of a UAV. The visual display can be shown on a screen or projected on to a screen by the display device. The screen can be a plasma screen, an LCD display, or a touch screen. The data can show an image of the UAV 602 relative to a simulated environment. The UAV 602 shown in the simulation can be a generic image of a UAV. Alternatively, the UAV 602 shown in the simulation can have specific features corresponding to a chosen UAV make and/or model. In some cases the UAV make and/or model can be specified by a user. Alternatively, the UAV make and/or model can be specified by the flight control system. The simulated environment can be chosen randomly or chosen by a user from a set of environments. The features of the environment can be saved on a memory storage device on-board the display device or on-board the UAV. In some cases an environment can be an environment that was encountered on a real flight previously performed by a UAV. Sensor data that was collected on the previous flight by the UAV in the environment can be used to recreate the environment in a virtual simulation. The environment in the simulation can be recreated using sensor data defining obstacle locations and ambient conditions (e.g. wind speed, air pressure, air density, and humidity). The simulated environment can include obstacles 603. The visual display can show a map of the simulated environment. The map can include topography of the environment. A user can control the UAV in the simulated environment to avoid and/or interact with the obstacles 603, obstacles can be topographical features in the environment. The visual display can further comprise a text box 604. The text box 604 can display a chart, graph, or table showing quantitative simulated flight data. In an example the text box can display distance traveled, current location in global or local coordinates, average speed, current speed, altitude, heading, battery power remaining, current wind speed, or other quantitative data that can be useful in controlling UAV flight. A user can specify the amount and type of data to be displayed in the text box 604.

Figure 7:
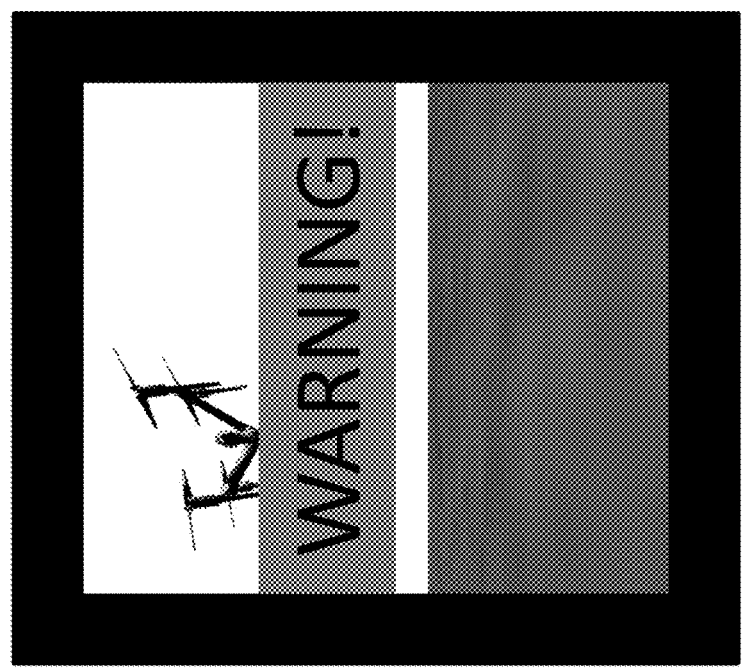
FIG. 7 shows an example of a hint or warning that can be displayed to a user during simulation mode operation.

Warnings and/or hints can be provided to a user in the user interface or display screen on a display device. The hints and/or warnings can occur when a UAV enters a specified region of the virtual environment. In some cases the hints and/or warnings can be provided when the flight state of the UAV is within a threshold value. Hints and/or warning can be provided when the UAV is out of control, when a landing gear deformation occurs, when the UAV battery is critically low, or when another flight hazard is detected. For example, a hint and/or warning can be provided when a UAV exceeds a threshold speed, falls below a threshold speed, falls below a remaining battery charge, or exceeds or falls below a threshold altitude. The warnings and/or hints can be provided to a user through an audio or visual stimulus. In an example, an audio stimulus can be a beep, buzz, or a spoken command. A visual stimulus can be a banner or window pop-up on the display screen on the display device. For example, a visual stimulus can be a banner across a screen with textual instructions as shown in FIG. 7. In some cases a stimulus can be a hint to a user to initiate a predetermined flight sequence. In an example, a hint that could be displayed on the screen could be "lose control", "initiate auto landing", "hover", "increase speed", "decrease speed", or "auto return". The hints can be provided in two tiers. In the first tier a hint can instruct a user to initiate a predetermined flight sequence generally. If the user does not initiate the correct predetermined flight sequence within a predetermined time interval, a second hint can be provided that specifies which predetermined flight sequence should be performed. In some cases, a user can disable hints and/or warnings.

An unmanned aerial vehicle (UAV) can have one or more sensors. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV can have sensor on-board the UAV that collect information directly from an environment without contacting an additional component off-board the UAV for additional information or processing. For example, a sensor that collects data directly in an environment can be a vision or audio sensor. Alternatively, the UAV can have sensors that are on-board the UAV but contact one or more components off-board the UAV to collect data about an environment. For example, a sensor that contacts a component off-board the UAV to collect data about an environment may be a GPS sensor or another sensor that relies on connection to a another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Sensors may be used for surveillance of an environment or a subject of interest.

Any description herein of a UAV may apply to any type of movable object. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output may be provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV may be of small dimensions. The UAV may be capable of being lifted and/or carried by a human. The UAV may be capable of being carried by a human in one hand.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant on-board the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 8:
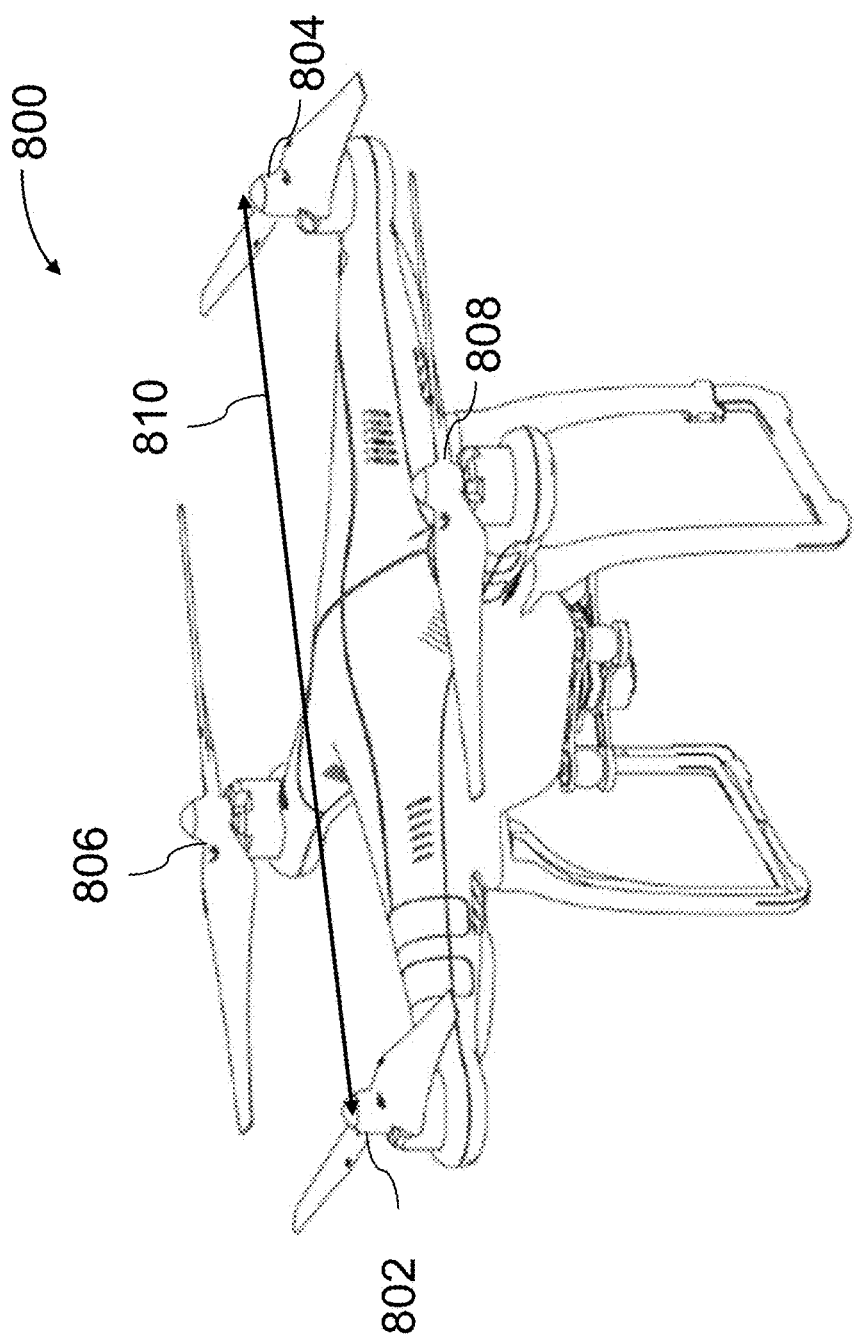
FIG. 8 illustrates an unmanned aerial vehicle, in accordance with an embodiment of the invention.

FIG. 8 illustrates an unmanned aerial vehicle (UAV) 800, in accordance with embodiments of the present invention. The UAV may be an example of a movable object as described herein. The UAV 800 can include a propulsion system having four rotors 802, 804, 806, and 808. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 810 can be less than or equal to 2 m, or less than equal to 5 m. In some embodiments, the length 810 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote controller device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 9:
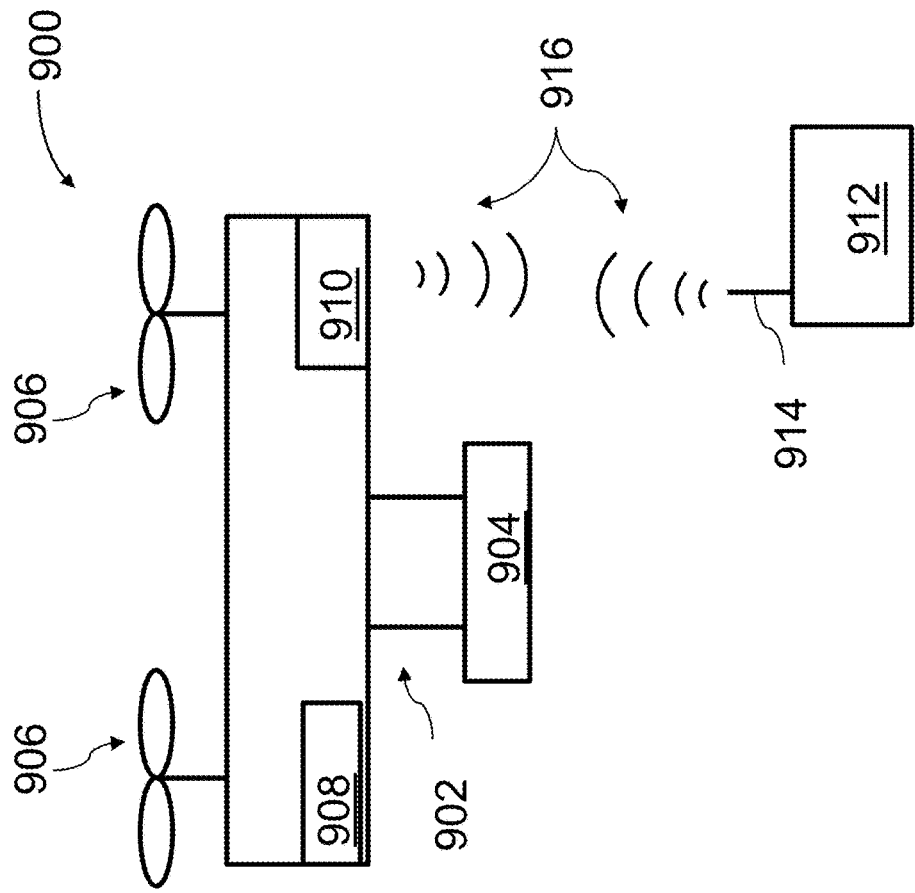
FIG. 9 illustrates a movable object including a carrier and a payload, in accordance with an embodiment of the invention.

FIG. 9 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 904 may be provided on the movable object 900 without requiring the carrier 902. The movable object 900 may include propulsion mechanisms 906, a sensing system 908, and a communication system 910.

The propulsion mechanisms 906 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 906 can be mounted on the movable object 900 using any suitable means, such as a support element (e.g., a drive shaft) as described elsewhere herein. The propulsion mechanisms 906 can be mounted on any suitable portion of the movable object 900, such on the top, bottom, front, back, sides, or suitable combinations thereof.

In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation. One or more of the propulsion mechanisms 900 may be controlled independently of the other propulsion mechanisms. Alternatively, the propulsion mechanisms 900 can be configured to be controlled simultaneously. For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 908 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

Figure 10:
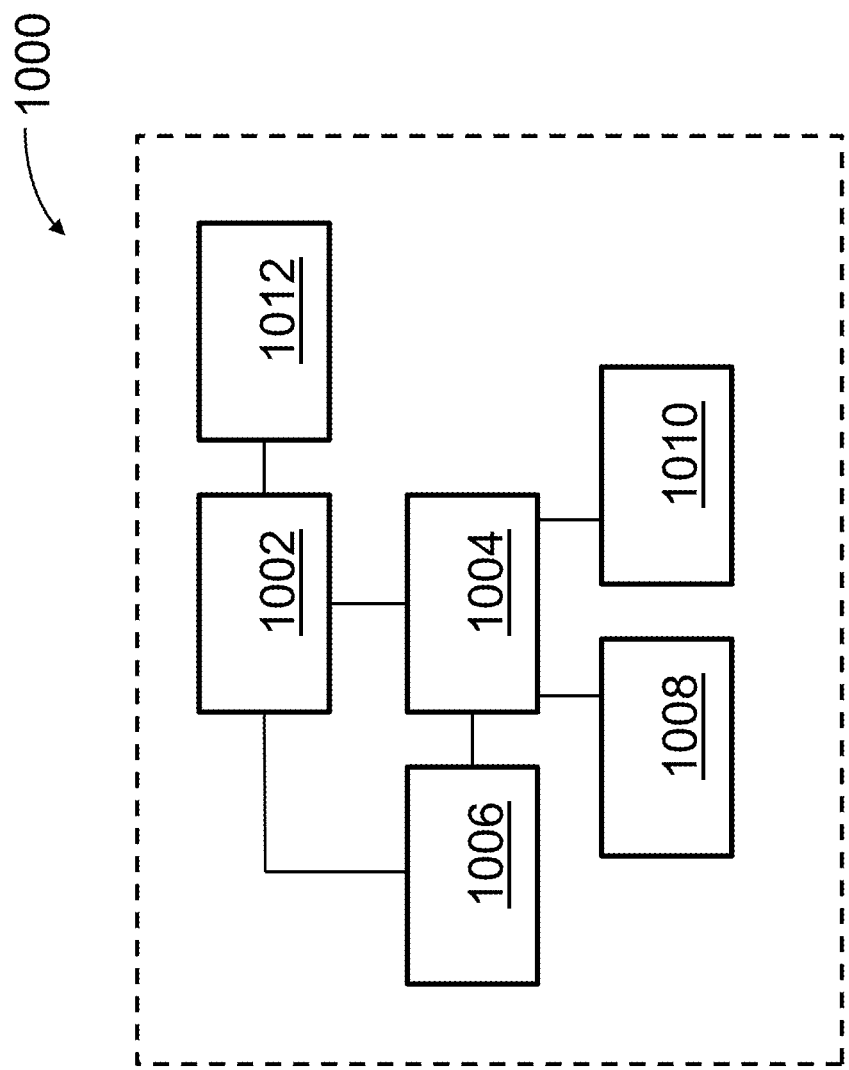
FIG. 10 is a schematic illustration by way of block diagram of a system for controlling a movable object, in accordance with an embodiment of the invention.

FIG. 10 is a schematic illustration by way of block diagram of a system 1000 for controlling a movable object, in accordance with embodiments. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication. For example, the communication module 1010 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1010 can transmit and/or receive one or more of sensing data from the sensing module 1002, processing results produced by the processing unit 1004, predetermined control data, user commands from a terminal or remote controller, and the like.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of operating a flight simulator, said method comprising:
receiving, at a display device, simulated flight data from a flight control system on-board an unmanned aerial vehicle (UAV) when the UAV is in a simulation mode, wherein the simulated flight data is provided to the display device via the UAV, and wherein the UAV is configured to communicate with a remote controller configured to control flight of the UAV when the UAV is in a flight mode, wherein virtual sensor data from one or more virtual sensors is provided to an inertial measurement unit configured to (1) receive the virtual sensor data when the UAV is in the simulation mode, (2) generate flight state information based on the virtual sensor data, and (3) communicate the flight state information to the flight control system; and
displaying, on a visual display of the display device, simulated flight state information of the UAV in response to the simulated flight data.

2. The method of claim 1, wherein the display device is a mobile device.

3. The method of claim 1, wherein the remote controller is configured to provide flight control data useful for generating the simulated flight data on-board the UAV when the UAV is in the simulation mode.

4. The method of claim 3, wherein the flight control system receives the virtual sensor data from the one or more virtual sensors when the UAV is in the simulation mode and uses the virtual sensor data to generate the simulated flight data.

5. The method of claim 1, wherein the virtual sensor data is generated by the one or more virtual sensors based on physical simulation data provided to said virtual sensors, and wherein the physical simulation data is provided by a physical model in response to a flight data, said flight data being generated at the flight control system in response to the flight control data, said physical model comprising physical parameter information about the UAV.

6. The method of claim 5, wherein the physical parameter information about the UAV comprises aerodynamic properties of the UAV.

7. The method of claim 1, wherein the simulated flight state information includes an image of the UAV relative to a simulated environment.

8. The method of claim 1, wherein the simulated flight data is provided to the display device via the UAV and the remote controller.

9. A method of operating a flight simulator, said method comprising:
receiving, at a flight control system on-board an unmanned aerial vehicle (UAV) when the UAV is in simulation mode, flight control data from a remote controller configured to (1) communicate with the UAV and (2) provide flight control data when the UAV is in the simulation mode;
receiving, at an inertial measurement unit, virtual sensor data generated by one or more virtual sensors;
generating, at the inertial measurement unit, flight state information based on the virtual sensor data;
transmitting the flight state information from the inertial measurement unit to the flight control system when the UAV is in the simulation mode;
generating, at the flight control system, simulated flight data in response to the flight control data from the remote controller; and
transmitting, to a display device comprising a visual display, the simulated flight data from the flight control system.

10. The method of claim 9, wherein the remote controller is configured to transmit the simulated flight data to the display device.

11. The method of claim 9, further comprising receiving, at the flight control system, the virtual sensor data from the one or more virtual sensors when the UAV is in the simulation mode and using the virtual sensor data to generate the simulated flight data.

12. The method of claim 9, further comprising:
generating, at the flight control system, flight data in response to the flight control data, wherein the flight data is generated from the virtual sensor data generated by the one or more virtual sensors based on physical simulation data provided to said virtual sensors when the UAV is in the simulation mode, and wherein the physical simulation data is provided by a physical model in response to the flight data, said physical model comprising physical parameter information about the UAV.

13. The method of claim 9, wherein the inertial measurement unit is configured to receive real sensor data and generate flight state information from the real sensor data, and configured to transmit the flight state information to the flight control system when the UAV is in a flight mode.

14. An unmanned aerial vehicle (UAV) comprising:
a flight control system configured to (1) receive flight control data from a remote controller, and (2) generate simulated flight data in response to the flight control data when the UAV is in a simulation mode;
an inertial measurement unit configured to (1) receive virtual sensor data from one or more virtual sensors, (2) generate flight state information from the virtual sensor data, and (3) transmit the flight state information to the flight control system when the UAV is in a flight simulation mode;
one or more propulsion units configured to (1) actuate and permit flight of the UAV when the UAV is in a flight mode, or (2) remain dormant and not permit flight of the UAV when the UAV is in a simulation mode; and
a communication unit configured to transmit the simulated flight data to a display device comprising a visual display.

15. The UAV of claim 14, wherein the flight control system is further configured to (3) generate one or more flight signal to be communicated to the one or more propulsion units when the UAV in flight mode.

16. The UAV of claim 14, wherein the remote controller is configured to transmit the simulated flight data to a display device comprising a visual display.

17. The UAV of claim 14, wherein the flight control system is configured to receive the virtual sensor data from the one or more virtual sensors when the UAV is in the simulation mode and is further configured to use the virtual sensor data to generate the simulated flight data.

18. The UAV of claim 14, wherein the virtual sensor data is generated by the one or more virtual sensors based on physical simulation data provided to said virtual sensors, and wherein the physical simulation data is provided by a physical model in response to the flight data, said physical model comprising physical parameter information about the UAV.

19. The UAV of claim 18, wherein the physical parameter information about the UAV comprises aerodynamic properties of the UAV.

20. The UAV of claim 14, wherein the inertial measurement unit is configured to receive real sensor data and generate flight state information from the real sensor data, and configured to transmit the flight state information from the real sensor data to the flight control system when the UAV is in a flight mode.

* * * * *